(12) United States Patent
Dai et al.

(10) Patent No.: US 11,181,718 B2
(45) Date of Patent: Nov. 23, 2021

(54) IMAGING LENS ASSEMBLY COMPRISING SEVEN LENSES OF –+++–++ OR ––++–++ REFRACTIVE POWERS

(71) Applicant: ZHEJIANG SUNNY OPTICAL CO., LTD, Ningbo (CN)

(72) Inventors: Fujian Dai, Ningbo (CN); Lin Huang, Ningbo (CN); Yuanlin Jia, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 65 days.

(21) Appl. No.: 15/780,099

(22) PCT Filed: Oct. 23, 2017

(86) PCT No.: PCT/CN2017/107324
§ 371 (c)(1),
(2) Date: May 30, 2018

(87) PCT Pub. No.: WO2018/209890
PCT Pub. Date: Nov. 22, 2018

(65) Prior Publication Data
US 2021/0173182 A1   Jun. 10, 2021

(30) Foreign Application Priority Data

May 18, 2017   (CN) .......................... 201710353145.3
May 18, 2017   (CN) .......................... 201720555343.3

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 4,046,459 A | 9/1977 | Kawamura |
| 9,442,277 B1 | 9/2016 | Shih |
| 2009/0052057 A1 | 2/2009 | Lin |

(Continued)

FOREIGN PATENT DOCUMENTS

| CN | 106199922 A | 12/2016 |
| CN | 206757163 U | 12/2017 |

(Continued)

*Primary Examiner* — Wen Huang
(74) *Attorney, Agent, or Firm* — Barnes & Thornburg LLP

(57) ABSTRACT

The present disclosure discloses an imaging lens assembly, the imaging lens assembly having a total effective focal length f and comprising sequentially, along an optical axis from an object side to an image side, a first lens, a second lens, a third lens, a fourth lens, a fifth lens, a sixth lens and a seventh lens. Each of the first lens and the fifth lens has a negative focal power; each of the second lens, the fourth lens, the sixth lens and the seventh lens has a positive focal power or a negative focal power; and the third lens has a positive focal power, and an effective focal length f3 of the third lens and the total effective focal length f satisfy: $1 < f3/f < 1.5$.

9 Claims, 11 Drawing Sheets

(56) References Cited

U.S. PATENT DOCUMENTS

| | | | |
|---|---|---|---|
| 2011/0317285 A1* | 12/2011 | Ohashi | G02B 9/64 |
| | | | 359/753 |
| 2014/0043694 A1 | 2/2014 | Tsai et al. | |
| 2015/0043091 A1 | 2/2015 | Bone et al. | |
| 2016/0109687 A1 | 4/2016 | Son | |
| 2017/0192200 A1* | 7/2017 | Hsieh | G02B 13/0045 |
| 2018/0031807 A1* | 2/2018 | Chen | G02B 13/0045 |

FOREIGN PATENT DOCUMENTS

| | | |
|---|---|---|
| JP | S59-44014 A | 3/1984 |
| JP | 2006301308 A | 11/2006 |

* cited by examiner

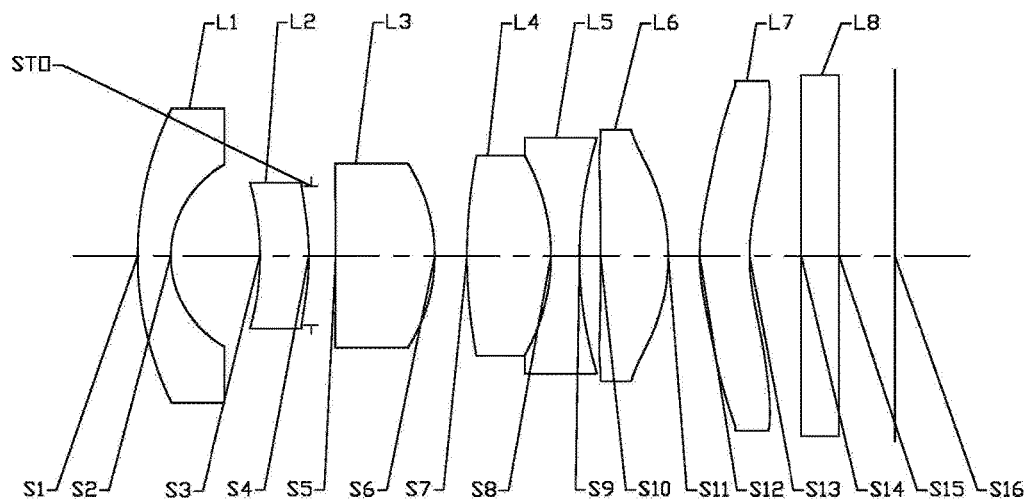
Fig. 5
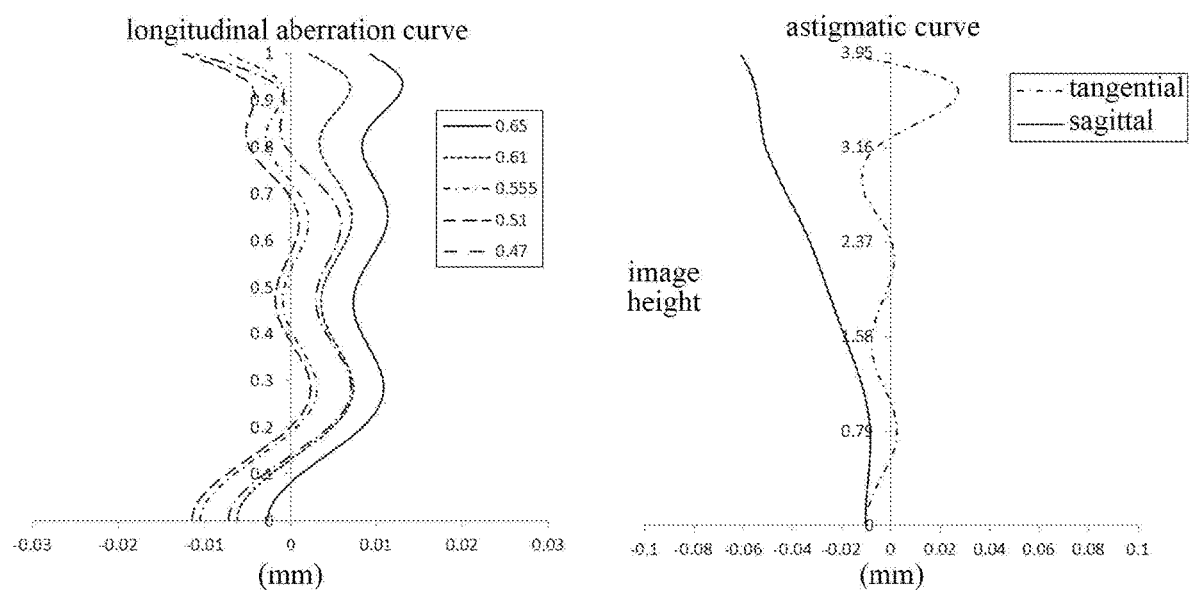
Fig. 6A
Fig. 6B

IMAGING LENS ASSEMBLY COMPRISING SEVEN LENSES OF −+++−++ OR −−++−++ REFRACTIVE POWERS

CROSS-REFERENCE TO RELATED APPLICATIONS

This application is a U.S. national counterpart application of international application serial No. PCT/CN2017/107324, filed Oct. 23, 2017, which claims priority to Chinese Patent Application Nos. 201710353145.3 and 201720555343.3 both filed May 18, 2017 the disclosures of which are hereby incorporated by reference in their entireties.

TECHNICAL FIELD

The present disclosure relates to an imaging lens assembly, and specifically to an imaging lens assembly comprising seven lenses.

BACKGROUND

In recent years, as the science and technology develop, portable electronic products are gradually rising. Portable electronic products with camera functions are increasingly treasured. Imaging lens assemblies mounted on moving equipment such as vehicle-mounted camera lens assemblies, surveillance camera lens assemblies and unmanned aerial vehicles also tend to develop towards the direction of high-pixel and wide viewing angle. In addition, higher requirements on maintaining the performance stability of the lens assemblies in different temperature conditions have also been brought forward.

As the performance dilatation coefficient of a glass lens is small and less affected by the temperature, lens assemblies with all-glass lenses may be used to achieve and maintain the performance stability in different temperature conditions. However, the all-glass lens assemblies have higher costs and are difficult to be miniaturized. Meanwhile, due to the use of spherical lenses, resolution of the lens assemblies is poor, resulting in a low price/performance ratio.

Therefore, there is a need for a wide-angle and miniaturized imaging lens assembly with a high image quality over a wide temperature range.

SUMMARY

The technical solution provided by the present disclosure at least partially solves the technical problems described above.

According to an aspect, the present disclosure provides an imaging lens assembly, the imaging lens assembly having a total effective focal length f, and including sequentially, along an optical axis from an object side to an image side, a first lens, a second lens, a third lens, a fourth lens, a fifth lens, a sixth lens and a seventh lens. Each of the first lens and the fifth lens has a negative focal power; each of the second lens, the fourth lens, the sixth lens and the seventh lens has a positive focal power or a negative focal power; and the third lens has a positive focal power, and an effective focal length f3 of the third lens and the total effective focal length f satisfy: $1<f3/f<1.5$.

In an implementation, the third lens is a glass lens.

In the present disclosure, multiple pieces (for example, seven pieces) of lenses are used. By properly allocating the focal power of each lens of the imaging lens assembly, and properly selecting the material of each lens assembly (as described above, the third lens may be a glass lens), the imaging lens assembly has the advantages of wide-angle, miniaturization and high resolution in the process of reducing the influence of temperature on the performance of the imaging lens assembly.

According to another aspect, the present disclosure provides such an imaging lens assembly, the imaging lens assembly having a total effective focal length f, and including sequentially, along an optical axis from an object side to an image side, a first lens, a second lens, a third lens, a fourth lens, a fifth lens, a sixth lens and a seventh lens. Each of the first lens and the fifth lens has a negative focal power; each of the second lens, the fourth lens, the sixth lens and the seventh lens has a positive focal power or a negative focal power; the third lens has a positive focal power; and a radius of curvature R3 of an object side surface of the second lens and a radius of curvature R4 of an image side surface of the second lens may satisfy: $0.6<R3/R4 1.4$.

According to another aspect, the present disclosure further provides such an imaging lens assembly, the imaging lens assembly having half of a maximal field-of-view HFOV, and including sequentially, along an optical axis from an object side to an image side, a first lens, a second lens, a third lens, a fourth lens, a fifth lens, a sixth lens and a seventh lens. Each of the first lens and the fifth lens has a negative focal power; each of the second lens, the fourth lens, the sixth lens and the seventh lens has a positive focal power or a negative focal power; and the third lens has a positive focal power, and the half of the maximal field-of-view HFOV may satisfy: $1.7<\tan(HFOV)<2.5$.

In an implementation, the image side surface of the second lens may be a convex surface, and an object side surface of the seventh lens may be a convex surface.

In an implementation, the fourth lens and the fifth lens are cemented to form a cemented lens.

In an implementation, a distance TTL from an object side surface of the first lens to an image plane of the imaging lens assembly on the optical axis and the total effective focal length f may satisfy: $4.2<TTL/f<5.5$.

In an implementation, the fourth lens has a positive focal power, and an effective focal length f4 of the fourth lens and the total effective focal length f may satisfy: $1<f4/f<1.7$.

In an implementation, an effective focal length f5 of the fifth lens and the total effective focal length f of the imaging lens assembly may satisfy: $-1.15<f5/f<0$.

In an implementation, a radius of curvature R2 of an image side surface of the first lens and an effective focal length f1 of the first lens may satisfy: $-0.6<R2/f1<-0.2$.

The imaging lens assembly with the above configuration may further have at least one of the beneficial effects of maintaining the performance stability in different temperatures, effectively correcting aberrations, shortening the total length of the optical system, and reducing the tolerance sensitivity of the lens assembly.

BRIEF DESCRIPTION OF THE DRAWINGS

In combination with the accompanying drawings, after reading detailed descriptions of the following non-limiting implementations, other features, objectives and advantages of the present disclosure will be more apparent. In the accompanying drawings:

FIG. 5 is a schematic structural diagram of an imaging lens assembly according to embodiment 3 of the present disclosure;

FIGS. 6A-6D respectively illustrate a longitudinal aberration curve, an astigmatic curve, a distortion curve and a lateral color curve of the imaging lens assembly according to embodiment 3;

DETAILED DESCRIPTION OF EMBODIMENTS

Figure 1:
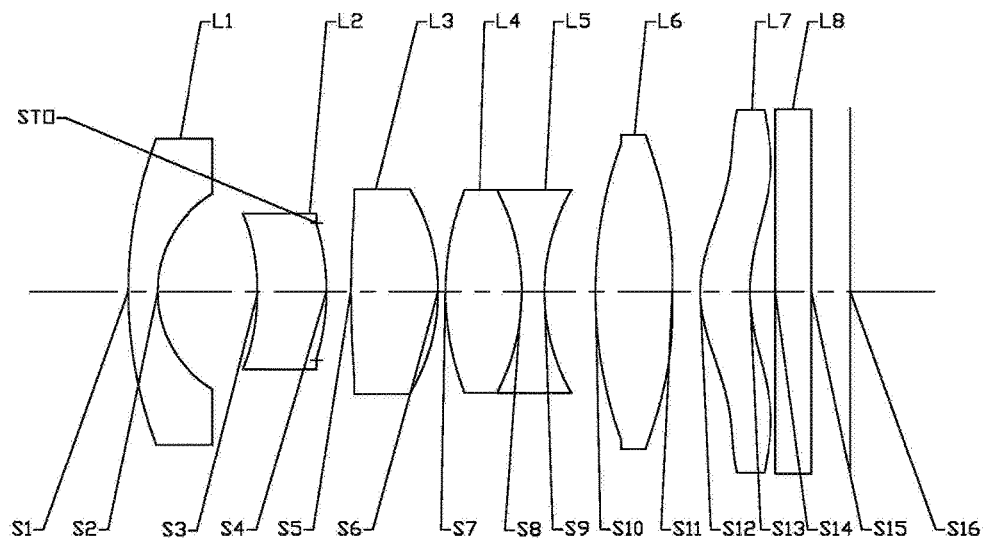
FIG. 1 is a schematic structural diagram of an imaging lens assembly according to embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals refer to the same elements. The expression "and/or" includes any and all combinations of one or more of the associated listed items.

It should be noted that in the present specification, the expressions of the first, the second, the third, etc. are only used to distinguish one feature from another, without indicating any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by way of example. That is, shapes of spherical surfaces or aspheric surfaces are not limited to the shapes of the spherical surfaces or the aspheric surfaces shown in the accompanying drawings. The accompanying drawings are merely illustrative and not strictly drawn to scale.

In addition, the paraxial area refers to an area near the optical axis. In this specification, the surface closest to the object in each lens is referred to as the object side surface, and the surface closest to the image plane in each lens is referred to as the image side surface.

It should be further understood that the terms "comprising," "including," "having" and variants thereof, when used in this specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of features, modify the entire list of features rather than an individual element in the list. Further, the use of "may", when describing implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The features, principles and other aspects of the present disclosure will be described in detail below.

An imaging lens assembly according to exemplary implementations of the present disclosure has, for example, seven lenses, i.e., a first lens, a second lens, a third lens, a fourth lens, a fifth lens, a sixth lens and a seventh lens. The seven lenses are arranged in sequence along an optical axis from an object side to an image side.

In the exemplary implementations, the first lens may have a negative focal power; the second lens may have a positive focal power or a negative focal power, and an image side surface of the second lens may be a convex surface; the third lens may have a positive focal power; the fourth lens may have a positive focal power or a negative focal power; the fifth lens may have a negative focal power; the sixth lens may have a positive focal power or a negative focal power; and the seventh lens may have a positive focal power or a negative focal power, and an object side surface of the seventh lens may be a convex surface.

The third lens may be a glass lens. Compared with a plastic lens, a glass lens has a smaller thermal expansion coefficient and is less affected by temperature. The third lens is made of a glass material, which can reduce the influence of temperature changes on the image quality, and thus helps to enhance the performance stability of the lens assembly at different temperatures. Mixed use of a glass lens and a plastic lens is to correct the influence of temperature changes on the image quality of the lens assembly, which requires that an effective focal length f3 of the third glass lens dominating temperature correction corresponds to a total effective focal length f of the imaging lens assembly. For example, the effective focal length f3 of the third lens and the total effective focal length f of the imaging lens assembly may satisfy: $1<f3/f<1.5$, and more specifically, f3 and f may further satisfy: $1.27 \leq f3/f \leq 1.49$.

The fourth lens and the fifth lens may be cemented to form a cemented lens. As known to those skilled in the art, a cemented lens is used to minimize or eliminate chromatic aberrations. The use of the cemented lens can improve the image quality, and reduce the reflection loss of light energy, thereby enhancing the image sharpness. In the present disclosure, by incorporating the cemented lens formed by the fourth lens and the fifth lens, the chromatic aberrations of the system can be corrected, the tolerance sensibility of the system can be reduced, and the image quality of the imaging lens assembly can be improved. In addition, the use of the cemented lens formed by the fourth lens and the fifth lens can also simplify the assembling procedure in the lens assembly manufacturing process, which is conductive to the mass production of lens assemblies.

In application, the focal power of each lens may be optimized. For example, an effective focal length f5 of the fifth lens and the total effective focal length f of the imaging lens assembly may satisfy: $-1.15<f5/f<0$, and more specifically, f5 and f may further satisfy: $-1.07 \leq f5/f \leq -0.75$.

In some implementations, the fourth lens may have a positive focal power. An effective focal length f4 of the fourth lens and the total effective focal length f of the imaging lens assembly may satisfy: $1<f4/f<1.7$, and more specifically, f4 and f may further satisfy: $1.17 \leq f4/f \leq 1.60$. When f4 and f satisfy $1<f4/f<1.7$, the fourth lens can provide a relatively small positive focal length in a situation of ensuring that the fourth lens satisfies the process ability condition, thereby facilitating the correction of the chromatic aberrations.

A distance TTL from an object side surface of the first lens to an image plane of the imaging lens assembly on the optical axis and the total effective focal length f of the imaging lens assembly may satisfy: $4.2<TTL/f<5.5$, and more specifically, TTL and f may further satisfy: $4.45 \leq TTL/f \leq 4.57$. This can help to enlarge the field-of-view angle while ensuring the miniaturization of the lens assembly, and effectively correct all types of aberrations, thereby improving the image quality.

Half of a maximal field-of-view angle of the imaging lens assembly HFOV may satisfy: $1.7<\tan(HFOV)<2.5$, and more specifically, HFOV may further satisfy: $1.85 \leq \tan(HFOV) \leq 2.12$. When the half of the maximal field-of-view angle of the imaging lens assembly HFOV satisfies $1.7<\tan(HFOV)<2.5$, the lens assembly can have a field-of-view angle as large as possible while the image quality of the lens assembly is ensured.

In addition, radii of curvature of an object side surface and the image side surface of the second lens may also be optimized. For example, the radius of curvature R3 of the object side surface of the second lens and the radius of curvature R4 of the image side surface of the second lens may satisfy: $0.6<R3/R4 \leq 1.4$, and more specifically, R3 and R4 may further satisfy: $0.62 \leq R3/R4 \leq 1.40$. When the radius of curvature R3 of the object side surface of the second lens is close to the radius of curvature R4 of the image side surface of the second lens, the imaging lens assembly can have a longer focal length; and at the same time, such configuration is conductive to correcting aberrations.

In order to reduce the tolerance sensibility of the first lens and facilitate the assembling of the lens assembly, it is necessary to properly allocate a radius of curvature R2 of an image side surface of the first lens, and an effective focal length f1 of the first lens. For example, the radius of curvature R2 of the image side surface of the first lens and the effective focal length f1 of the first lens may satisfy: $-0.6<R2/f1<-0.2$, and more specifically, R2 and f1 may further satisfy: $-0.52 \leq R2/f1 \leq -0.39$.

As known to those skilled in the art, an aspheric lens has a better radius-of-curvature characteristic, and then has advantages of improving a distortion aberration and improving an astigmatic aberration, which can improve the image quality. In use, for example, at least one of object side surfaces and image side surfaces of the second lens, the sixth lens, and/or the seventh lens may be arranged as an aspheric mirror surface to further improve the image quality of the lens assembly.

In the implementations of the present disclosure, an aperture STO may also be provided between, for example, the second lens and the third lens, to effectively contract the light entering the imaging lens assembly, thereby improving the image quality of the lens assembly. It should be understood by those skilled in the art that the aperture STO may be set at other positions as needed, that is, the setting of the aperture STO should not be limited to the positions shown in the accompanying drawings.

The imaging lens assembly according to the implementations of the present disclosure may use multiple lenses, for example, seven as described above. By properly allocating the focal power and surface type of each lens, the center thickness of each lens, the axial spacing distances between the lenses, etc., it is possible to effectively enlarge the field-of-view angle of the imaging lens assembly, reduce the influence of temperature on the optical system, ensure the miniaturization of the lens assembly, improve the relative illumination of the lens assembly and improve the image quality of the lens assembly. The imaging lens assembly described above may be applied to portable electronic products, and may also be suitable for mounting on sports equipments such as vehicle-mounted camera lens assemblies, surveillance camera lens assemblies and unmanned aerial vehicles.

However, it should be understood by those skilled in the art that the various results and advantages described in the present specification can be obtained by changing the number of the lenses forming the lens assembly without departing from the technical solution sought to be protected by the present disclosure. For example, although seven lenses are described as an example in the implementations, the imaging lens assembly is not limited to include seven lenses. If desired, the imaging lens assembly may also include other numbers of lenses.

Specific embodiments of the imaging lens assembly that may be applied to the above-described implementations are further described below with reference to the accompanying drawings.

Embodiment 1

An imaging lens assembly according to embodiment 1 of the present disclosure is described below with reference to FIGS. 1 to 2D. FIG. 1 is a schematic structural diagram of the imaging lens assembly according to embodiment 1 of the present disclosure.

As shown in FIG. 1, the imaging lens assembly includes, along an optical axis, seven lenses L1 to L7 arranged in sequence from an object side to an image side. The first lens L1 has an object side surface S1 and an image side surface S2; the second lens L2 has an object side surface S3 and an image side surface S4; the third lens L3 has an object side surface S5 and an image side surface S6; the fourth lens L4 has an object side surface S7 and an image side surface S8; the fifth lens L5 has an object side surface S9 and an image side surface S10; the sixth lens L6 has an object side surface S11 and an image side surface S12; and the seventh lens L7 has an object side surface S13 and an image side surface S14. The fourth lens L4 and the fifth lens L5 are cemented to form a cemented lens. Alternatively, the imaging lens assembly may further include an optical filter L8 having an object side surface S15 and an image side surface S16. In the imaging lens assembly of the present embodiment, an aperture STO for limiting the light beam may also be provided to improve the image quality. Light from an object passes through the surfaces S1 to S16 sequentially and is finally imaged on an image plane S17.

Table 1 shows the surface type, the radius of curvature, the thickness, the material and the conic coefficient of each lens of the imaging lens assembly of embodiment 1, wherein the unit for the radius of curvature and the thickness is millimeter (mm).

As may be obtained from Table 1, the radius of curvature R3 of the object side surface S3 of the second lens L2 and the radius of curvature R4 of the image side surface S4 of the second lens L2 satisfy: R3/R4=1.14.

In this embodiment, seven lenses are used as an example. By properly allocating the focal length and the surface type of each lens, the field-of-view angle of the lens assembly is effectively enlarged, the total length of the lens assembly is shortened, and the influence of temperature changes on the image quality is corrected. At the same time, various types of aberrations are corrected, and the resolution and the image quality of the lens assembly are improved. The surface type x of each aspheric surface is defined by the following formula:

$$x = \frac{ch^2}{1 + \sqrt{1 - (k+1)c^2h^2}} + \sum Aih^i. \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in the Table 1 above); and Ai is the correction coefficient of the $i^{th}$ order of the aspheric surface. Table 2 below shows the higher-order coefficients $A_4$, $A_6$, $A_8$, $A_{10}$, $A_{12}$, $A_{14}$ and $A_{16}$ applicable to the aspheric mirror surfaces S3, S4, S11, S12 and S13 in embodiment 1.

TABLE 1

| surface number | surface type | radius of curvature | thickness | material index of refraction | material dispersion coefficient | conic coefficient |
|---|---|---|---|---|---|---|
| OBJ | spherical | infinite | infinite | | | |
| S1 | spherical | 9.6634 | 0.6500 | 1.732 | 54.68 | |
| S2 | spherical | 2.5362 | 2.2183 | | | |
| S3 | aspheric | −5.7394 | 1.5313 | 1.645 | 23.53 | −0.6469 |
| S4 | aspheric | −5.0485 | −0.2161 | | | 0.3292 |
| STO | spherical | infinite | 0.7541 | | | |
| S5 | spherical | 25.5967 | 1.9298 | 1.807 | 56.57 | |
| S6 | spherical | −4.4288 | 0.1614 | | | |
| S7 | spherical | 6.1884 | 1.7046 | 1.591 | 64.14 | |
| S8 | spherical | −4.8831 | 0.5000 | 1.853 | 23.78 | |
| S9 | spherical | 4.5632 | 1.1260 | | | |
| S10 | spherical | 9.8374 | 1.7011 | 1.546 | 56.11 | |
| S11 | aspheric | infinite | 0.6163 | | | −98.9818 |
| S12 | aspheric | 2.6752 | 1.1014 | 1.546 | 56.11 | −4.5044 |
| S13 | aspheric | 3.9892 | 0.5702 | | | −4.0426 |
| S14 | spherical | infinite | 0.8000 | 1.517 | 64.17 | |
| S15 | spherical | infinite | 0.8601 | | | |
| S16 | spherical | infinite | | | | |

TABLE 2

| Surface number | A4 | A6 | A8 | A10 | A12 | A14 | A16 |
|---|---|---|---|---|---|---|---|
| S3 | −7.2185E−03 | 1.2809E−04 | 3.2896E−06 | −2.4476E−07 | 5.3992E−09 | −5.2934E−11 | 1.9592E−13 |
| S4 | 7.0105E−04 | −3.3937E−04 | 1.2965E−03 | −1.1875E−03 | 6.2973E−04 | −1.7163E−04 | 1.8836E−05 |
| S11 | −2.1039E−02 | 5.1825E−03 | −9.2174E−04 | 1.1284E−04 | −8.6741E−06 | 3.7296E−07 | −6.8288E−09 |
| S12 | −1.8843E−03 | −6.8724E−04 | 7.1636E−05 | −2.6597E−06 | 4.7938E−08 | −4.2361E−10 | 1.4682E−12 |
| S13 | −1.1709E−03 | −1.2110E−03 | 1.5168E−04 | −9.3184E−06 | 3.3024E−07 | −6.1337E−09 | 4.5550E−11 |

Table 3 below shows the effective focal lengths f1 to f7 of the lenses, the total effective focal length f of the imaging lens assembly, the half of the diagonal length ImgH of the effective pixel area on the image plane S17, the half of the maximal field-of-view HFOV of the imaging lens assembly and the distance TTL from the object side surface S1 of the first lens L1 to the image plane S17 of the imaging lens assembly on the optical axis in embodiment 1.

TABLE 3

| Parameter | f1(mm) | f2(mm) | f3(mm) | f4(mm) | f5(mm) | f6(mm) | f7(mm) |
|---|---|---|---|---|---|---|---|
| Numerical value | −4.89 | 34.82 | 4.82 | 4.90 | −2.70 | 18.02 | 11.48 |

| Parameter | f(mm) | ImgH(mm) | HFOV(°) | TTL(mm) |
|---|---|---|---|---|
| Numerical value | 3.50 | 4.08 | 64.75 | 16.01 |

According to Table 3, the effective focal length f3 of the third lens L3 and the total effective focal length f of the imaging lens assembly satisfy: f3/f=1.37; the effective focal length f4 of the fourth lens L4 and the total effective focal length f of the imaging lens assembly satisfy: f4/f=1.40; the effective focal length f5 of the fifth lens L5 and the total effective focal length f of the imaging lens assembly satisfy: f5/f=−0.77; the distance TTL from the object side surface S1 of the first lens L1 to the image plane S17 of the imaging lens assembly on the optical axis and the total effective focal length f of the imaging lens assembly satisfy: TTL/f=4.57; and the half of the maximal field-of-view HFOV of the imaging lens assembly satisfies: tan(HFOV)=2.12. With reference to Table 1 and Table 3, it is found that the radius of curvature R2 of the image side surface S2 of the first lens L1 and the effective focal length f1 of the first lens L1 satisfy: R2/f1=−0.52.

Figure 2A:
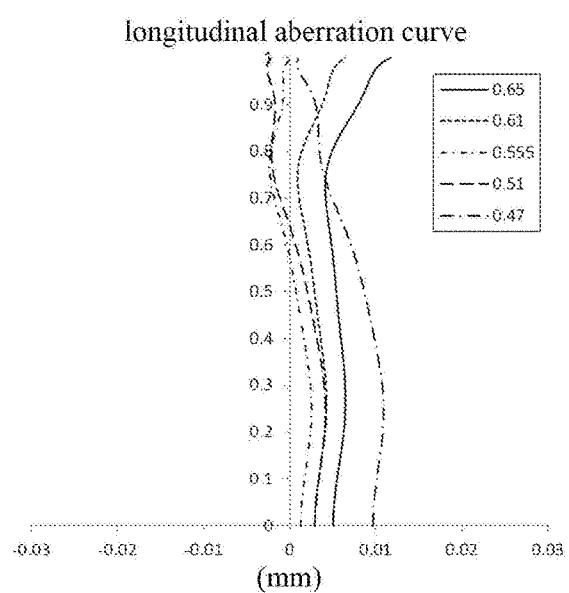
FIGS. 2A-2D respectively illustrate a longitudinal aberration curve, an astigmatic curve, a distortion curve and a lateral color curve of the imaging lens assembly according to embodiment 1.
Figure 2B:
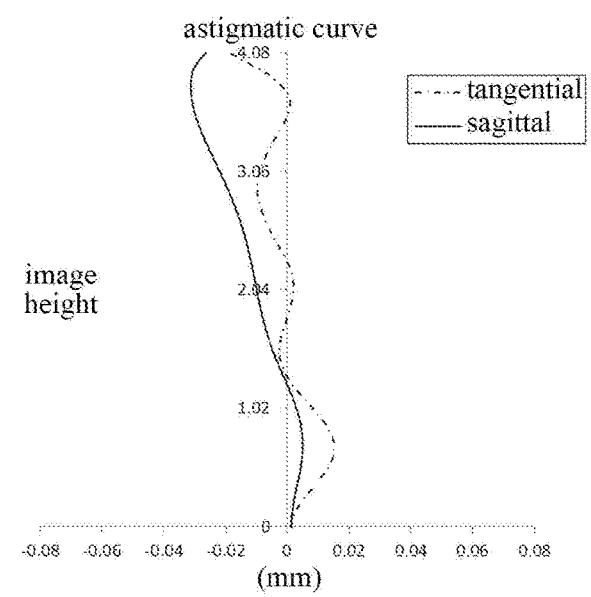
Figure 2C:
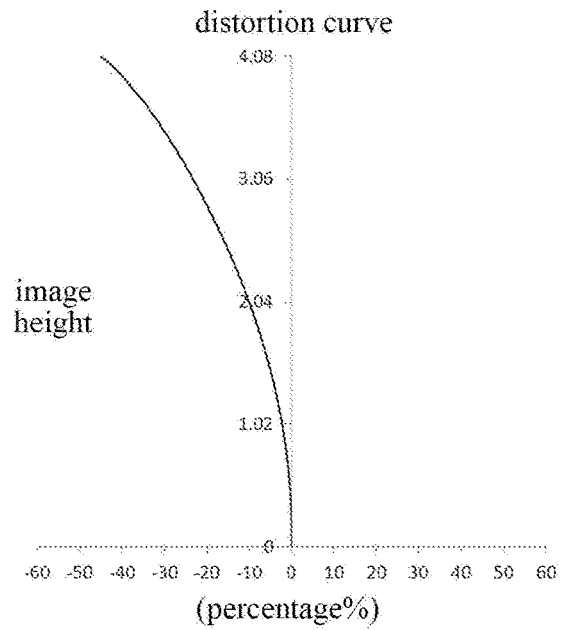
Figure 2D:
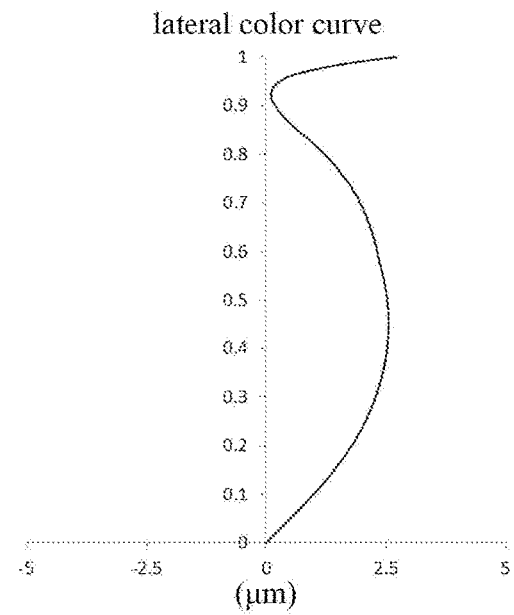

FIG. 2A shows a longitudinal aberration curve of the imaging lens assembly according to embodiment 1, representing deviations of focal points of light of different wavelengths converged after passing through the imaging lens assembly. FIG. 2B shows an astigmatic curve of the imaging lens assembly according to embodiment 1, representing a curvature of a tangential image plane and a curvature of a sagittal image plane. FIG. 2C shows a distortion curve of the imaging lens assembly according to embodiment 1, representing amounts of distortion at different viewing angles. FIG. 2D shows a lateral color curve of the imaging lens assembly according to embodiment 1, representing deviations of different image heights on an image plane after light passes through the imaging lens assembly. It can be seen from FIGS. 2A to 2D that the imaging lens assembly according to embodiment 1 can achieve a good image quality.

Embodiment 2

Figure 3:
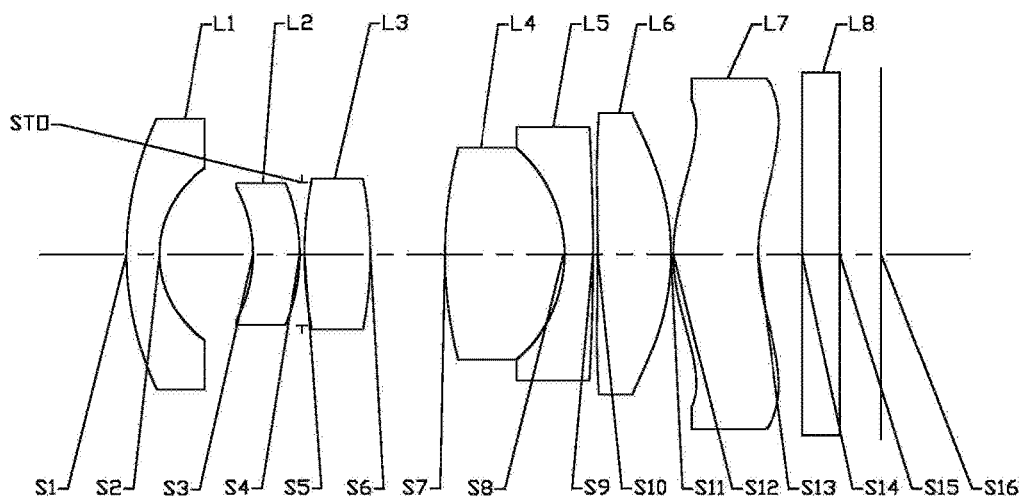
FIG. 3 is a schematic structural diagram of an imaging lens assembly according to embodiment 2 of the present disclosure.

An imaging lens assembly according to embodiment 2 of the present disclosure is described below with reference to FIGS. 3 to 4D. In the present embodiment and the following embodiments, for the purpose of brevity, the description of parts similar to those in embodiment 1 will be omitted. FIG. 3 is a schematic structural diagram of the imaging lens assembly according to embodiment 2 of the present disclosure.

As shown in FIG. 3, the imaging lens assembly includes, along an optical axis, seven lenses L1 to L7 arranged in sequence from an object side to an image side. The first lens L1 has an object side surface S1 and an image side surface S2; the second lens L2 has an object side surface S3 and an image side surface S4; the third lens L3 has an object side surface S5 and an image side surface S6; the fourth lens L4 has an object side surface S7 and an image side surface S8; the fifth lens L5 has an object side surface S9 and an image side surface S10; the sixth lens L6 has an object side surface S11 and an image side surface S12; and the seventh lens L7 has an object side surface S13 and an image side surface S14. The fourth lens L4 and the fifth lens L5 are cemented to form a cemented lens. Alternatively, the imaging lens assembly may further include an optical filter L8 having an object side surface S15 and an image side surface S16. In the imaging lens assembly of the present embodiment, an aperture STO for limiting the light beam may also be provided to improve the image quality. Light from an object passes through the surfaces S1 to S16 sequentially and is finally imaged on an image plane S17.

Table 4 shows the surface type, the radius of curvature, the thickness, the material and the conic coefficient of each lens of the imaging lens assembly of embodiment 2, wherein the unit for the radius of curvature and the thickness is millimeter (mm). Table 5 shows higher-order coefficients of each aspheric mirror surface in embodiment 2. Table 6 shows the effective focal lengths f1 to f7 of the lenses, the total effective focal length f of the imaging lens assembly, the half of the diagonal length ImgH of the effective pixel area on the image plane S17, the half of the maximal field-of-view HFOV of the imaging lens assembly and the distance TTL from the object side surface S1 of the first lens L1 to the image plane S17 of the imaging lens assembly on the optical axis in embodiment 2. Here, the respective aspheric surface types may be defined by the formula (1) given in the above embodiment 1.

TABLE 4

| surface number | surface type | radius of curvature | thickness | material index of refraction | dispersion coefficient | conic coefficient |
|---|---|---|---|---|---|---|
| OBJ | spherical | infinite | infinite | | | |
| S1 | spherical | 6.7778 | 0.7000 | 1.732 | 54.68 | |
| S2 | spherical | 2.2000 | 1.9923 | | | |
| S3 | aspheric | −2.9506 | 0.9873 | 1.645 | 23.53 | 0.8231 |
| S4 | aspheric | −3.9251 | 0.0500 | | | −0.5472 |
| STO | spherical | infinite | 0.0500 | | | |
| S5 | spherical | 8.1043 | 1.3948 | 1.807 | 56.57 | |
| S6 | spherical | −8.1846 | 1.5763 | | | |
| S7 | spherical | 9.1370 | 2.5459 | 1.591 | 64.14 | |
| S8 | spherical | −3.0000 | 0.6000 | 1.853 | 23.78 | |
| S9 | spherical | −50.0000 | 0.1033 | | | |
| S10 | aspheric | −27.6440 | 1.5467 | 1.546 | 56.11 | 0.0000 |
| S11 | aspheric | −5.2695 | 0.0500 | | | 0.0000 |
| S12 | aspheric | 3.7768 | 1.7966 | 1.546 | 56.11 | 0.0000 |
| S13 | aspheric | 4.1169 | 0.9363 | | | 0.0000 |
| S14 | spherical | infinite | 0.8000 | 1.517 | 64.17 | |
| S15 | spherical | infinite | 0.8705 | | | |
| S16 | spherical | infinite | | | | |

TABLE 5

| Surface number | A4 | A6 | A8 | A10 | A12 | A14 | A16 |
|---|---|---|---|---|---|---|---|
| S3 | 4.8540E−03 | 1.6463E−03 | −1.1453E−03 | 7.2924E−04 | −1.8882E−04 | 7.3343E−06 | 3.8579E−06 |
| S4 | −8.1765E−05 | −3.9458E−03 | 6.2793E−03 | −5.6195E−03 | 2.7510E−03 | −6.9738E−04 | 7.1459E−05 |
| S10 | 8.2159E−03 | −1.9622E−03 | 2.3361E−04 | 4.2219E−06 | −4.7012E−06 | 5.0415E−07 | −1.6583E−08 |
| S11 | 4.3118E−03 | −2.9069E−03 | 9.5921E−04 | −1.7117E−04 | 1.8493E−05 | −1.1614E−06 | 3.3243E−08 |
| S12 | −8.7381E−03 | −2.1927E−03 | 5.6086E−04 | −7.0974E−05 | 4.6112E−06 | −1.4372E−07 | 9.9722E−10 |
| S13 | −7.1778E−03 | −1.8328E−03 | 3.8218E−04 | −3.9732E−05 | 2.1778E−06 | −5.8846E−08 | 4.7272E−10 |

TABLE 6

| Parameter | f1(mm) | f2(mm) | f3(mm) | f4(mm) | f5(mm) | f6(mm) | f7(mm) |
|---|---|---|---|---|---|---|---|
| Numerical value | −4.76 | −30.58 | 5.25 | 4.15 | −3.76 | 11.64 | 29.22 |

| Parameter | f(mm) | ImgH(mm) | HFOV(°) | TTL(mm) |
|---|---|---|---|---|
| Numerical value | 3.53 | 3.93 | 62.13 | 16.00 |

Figure 4A:
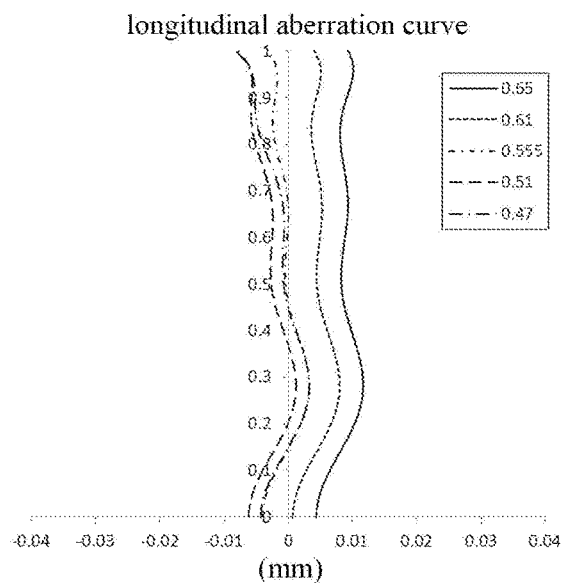
FIGS. 4A-4D respectively illustrate a longitudinal aberration curve, an astigmatic curve, a distortion curve and a lateral color curve of the imaging lens assembly according to embodiment 2.
Figure 4B:
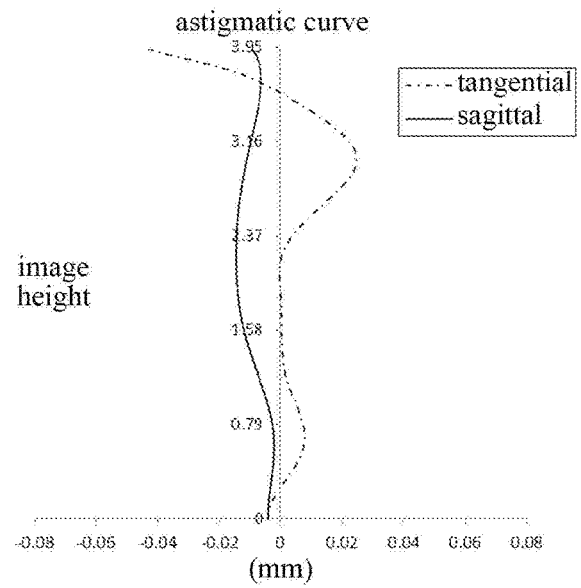
Figure 4C:
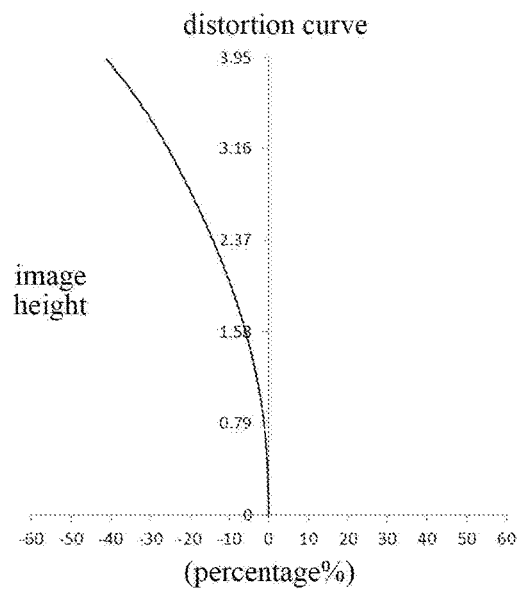
Figure 4D:
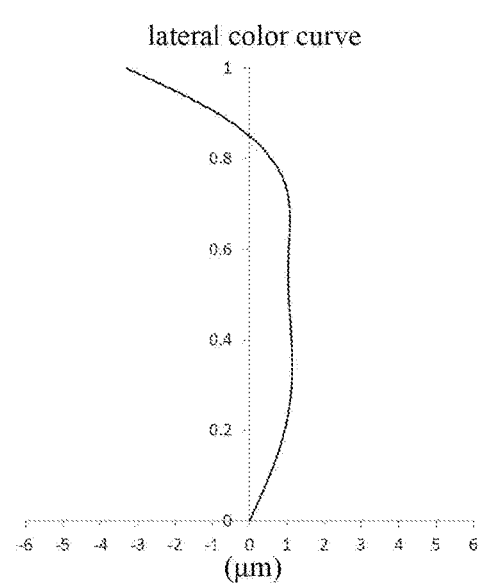

FIG. 4A shows a longitudinal aberration curve of the imaging lens assembly according to embodiment 2, representing deviations of focal points of light of different wavelengths converged after passing through the imaging lens assembly. FIG. 4B shows an astigmatic curve of the imaging lens assembly according to embodiment 2, representing a curvature of a tangential image plane and a curvature of a sagittal image plane. FIG. 4C shows a distortion curve of the imaging lens assembly according to embodiment 2, representing amounts of distortion at different viewing angles. FIG. 4D shows a lateral color curve of the imaging lens assembly according to embodiment 2, representing deviations of different image heights on an image plane after light passes through the imaging lens assembly. It can be seen from FIGS. 4A to 4D that the imaging lens assembly according to embodiment 2 can achieve a good image quality.

Embodiment 3

Figure 6C:
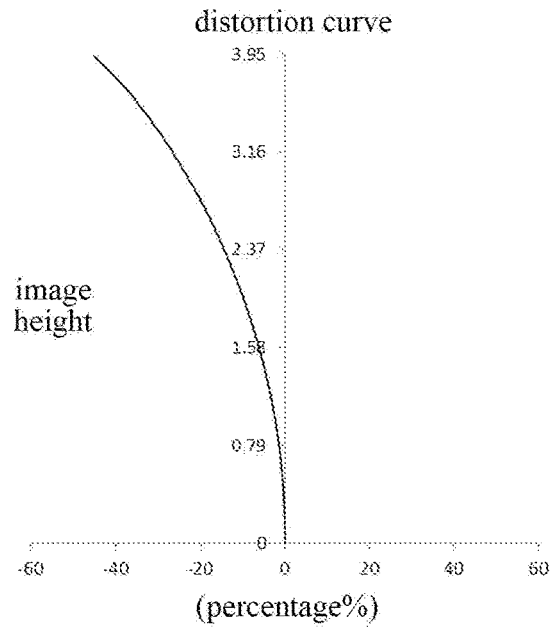
Figure 6D:
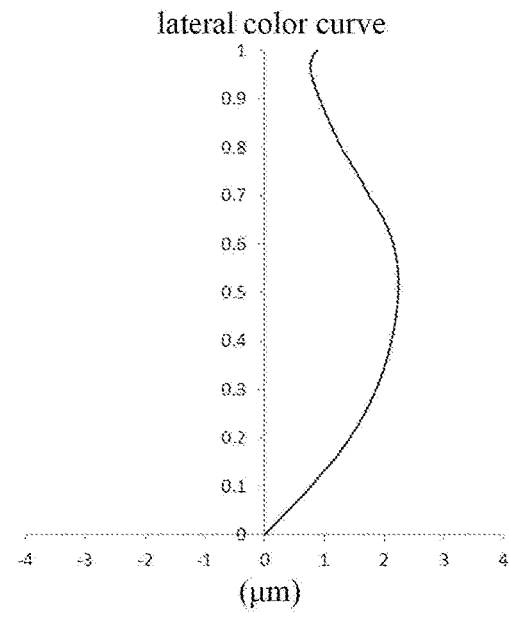

An imaging lens assembly according to embodiment 3 of the present disclosure is described below with reference to FIGS. 5 to 6D. FIG. 5 is a schematic structural diagram of the imaging lens assembly according to embodiment 3 of the present disclosure.

As shown in FIG. 5, the imaging lens assembly includes, along an optical axis, seven lenses L1 to L7 arranged in sequence from an object side to an image side. The first lens L1 has an object side surface S1 and an image side surface S2; the second lens L2 has an object side surface S3 and an image side surface S4; the third lens L3 has an object side surface S5 and an image side surface S6; the fourth lens L4 has an object side surface S7 and an image side surface S8; the fifth lens L5 has an object side surface S9 and an image side surface S10; the sixth lens L6 has an object side surface S11 and an image side surface S12; and the seventh lens L7 has an object side surface S13 and an image side surface S14. The fourth lens L4 and the fifth lens L5 are cemented to form a cemented lens. Alternatively, the imaging lens assembly may further include an optical filter L8 having an object side surface S15 and an image side surface S16. In the imaging lens assembly of the present embodiment, an aperture STO for limiting the light beam may also be provided to improve the image quality. Light from an object passes through the surfaces S1 to S16 sequentially and is finally imaged on an image plane S17.

Table 7 shows the surface type, the radius of curvature, the thickness, the material and the conic coefficient of each lens of the imaging lens assembly of embodiment 3, wherein the unit for the radius of curvature and the thickness is millimeter (mm). Table 8 shows higher-order coefficients of each aspheric mirror surface in embodiment 3. Table 9 shows the effective focal lengths f1 to f7 of the lenses, the total effective focal length f of the imaging lens assembly, the half of the diagonal length ImgH of the effective pixel area on the image plane S17, the half of the maximal field-of-view HFOV of the imaging lens assembly and the distance TTL from the object side surface S1 of the first lens L1 to the image plane S17 of the imaging lens assembly on the optical axis in embodiment 3. Here, the respective aspheric surface types may be defined by the formula (1) given in the above embodiment 1.

lens assembly according to embodiment 3, representing a curvature of a tangential image plane and a curvature of a sagittal image plane. FIG. 6C shows a distortion curve of the imaging lens assembly according to embodiment 3, representing amounts of distortion at different viewing angles. FIG. 6D shows a lateral color curve of the imaging lens assembly according to embodiment 3, representing deviations of different image heights on an image plane after light passes through the imaging lens assembly. It can be seen from FIGS. 6A to 6D that the imaging lens assembly according to embodiment 3 can achieve a good image quality.

Embodiment 4

An imaging lens assembly according to embodiment 4 of the present disclosure is described below with reference to

TABLE 7

| surface number | surface type | radius of curvature | thickness | index of refraction | dispersion coefficient | conic coefficient |
|---|---|---|---|---|---|---|
| OBJ | spherical | infinite | infinite | | | |
| S1 | spherical | 7.1471 | 0.7000 | 1.732 | 54.68 | |
| S2 | spherical | 2.2000 | 1.8943 | | | |
| S3 | aspheric | −6.0282 | 1.0277 | 1.645 | 23.53 | 4.9309 |
| S4 | aspheric | −5.7792 | 0.0500 | | | −16.5598 |
| STO | spherical | infinite | 0.5175 | | | |
| S5 | spherical | −100.0000 | 2.0872 | 1.807 | 56.57 | |
| S6 | spherical | −3.6456 | 0.6796 | | | |
| S7 | spherical | 11.3064 | 1.7840 | 1.591 | 64.14 | |
| S8 | spherical | −4.3122 | 0.6000 | 1.853 | 23.78 | |
| S9 | spherical | 8.6497 | 0.4447 | | | |
| S10 | aspheric | −140.4317 | 1.4279 | 1.546 | 56.11 | 0.0000 |
| S11 | aspheric | −4.5269 | 0.6600 | | | 0.0000 |
| S12 | aspheric | 4.1120 | 1.0499 | 1.546 | 56.11 | 0.0000 |
| S13 | aspheric | 4.1918 | 1.1036 | | | 0.0000 |
| S14 | spherical | infinite | 0.8000 | 1.517 | 64.17 | |
| S15 | spherical | infinite | 1.1734 | | | |
| S16 | spherical | infinite | | | | |

TABLE 8

| Surface number | A4 | A6 | A8 | A10 | A12 | A14 | A16 |
|---|---|---|---|---|---|---|---|
| S3 | −5.0561E−04 | 9.7638E−04 | 1.5370E−05 | 8.8931E−05 | −5.6889E−05 | 9.2825E−06 | 5.5438E−08 |
| S4 | −3.6858E−03 | −6.6265E−03 | 1.8358E−02 | −1.8972E−02 | 1.0668E−02 | −3.1006E−03 | 3.6459E−04 |
| S10 | −7.5309E−04 | −8.0633E−04 | 4.2678E−04 | −1.0040E−04 | 1.6905E−05 | −1.5260E−06 | 5.5919E−08 |
| S11 | −7.5478E−03 | 1.6779E−03 | 3.4018E−05 | −7.1729E−05 | 1.5885E−05 | −1.4080E−06 | 4.9413E−08 |
| S12 | −2.0693E−02 | 2.5172E−03 | −2.0894E−04 | 1.0596E−05 | −4.0189E−07 | 1.5042E−08 | −4.7628E−10 |
| S13 | −1.6790E−02 | 8.1195E−04 | 7.2357E−05 | −1.9613E−05 | 1.6479E−06 | −6.4074E−08 | 8.6098E−10 |

TABLE 9

| Parameter | f1(mm) | f2(mm) | f3(mm) | f4(mm) | f5(mm) | f6(mm) | f7(mm) |
|---|---|---|---|---|---|---|---|
| Numerical value | −4.62 | 82.92 | 4.64 | 5.52 | −3.30 | 8.54 | 70.07 |

| Parameter | f(mm) | ImgH(mm) | HFOV(°) | TTL(mm) |
|---|---|---|---|---|
| Numerical value | 3.58 | 3.93 | 63.39 | 16.00 |

Figure 7:
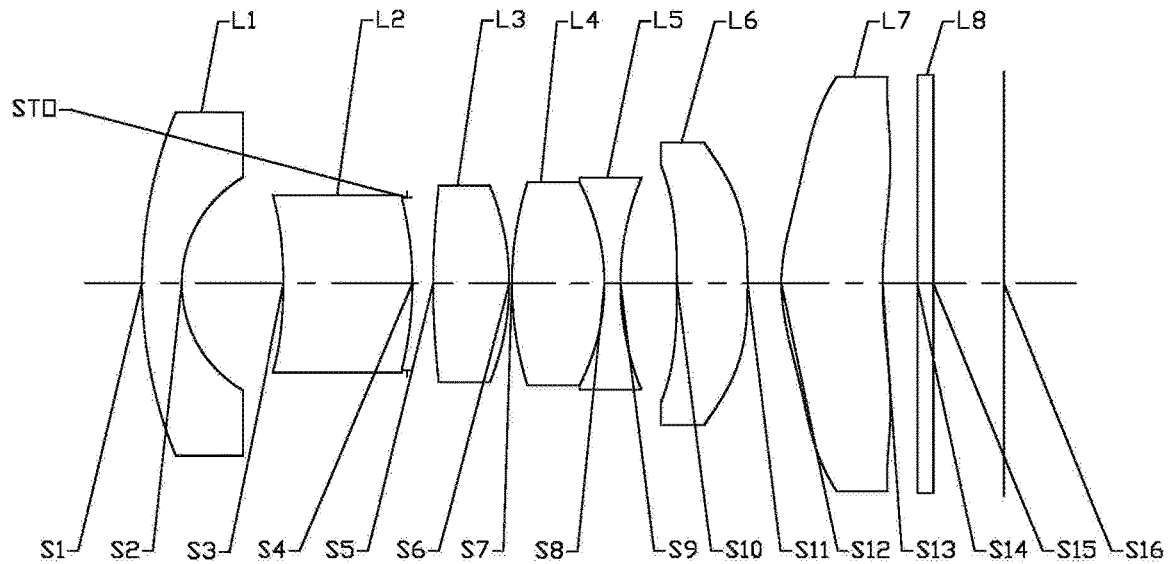
FIG. 7 is a schematic structural diagram of an imaging lens assembly according to embodiment 4 of the present disclosure.

FIG. 6A shows a longitudinal aberration curve of the imaging lens assembly according to embodiment 3, representing deviations of focal points of light of different wavelengths converged after passing through the imaging lens assembly. FIG. 6B shows an astigmatic curve of the imaging FIGS. 7 to 8D. FIG. 7 is a schematic structural diagram of the imaging lens assembly according to embodiment 4 of the present disclosure.

As shown in FIG. 7, the imaging lens assembly includes, along an optical axis, seven lenses L1 to L7 arranged in sequence from an object side to an image side. The first lens L1 has an object side surface S1 and an image side surface S2; the second lens L2 has an object side surface S3 and an image side surface S4; the third lens L3 has an object side surface S5 and an image side surface S6; the fourth lens L4 has an object side surface S7 and an image side surface S8; the fifth lens L5 has an object side surface S9 and an image side surface S10; the sixth lens L6 has an object side surface S11 and an image side surface S12; and the seventh lens L7 has an object side surface S13 and an image side surface S14. The fourth lens L4 and the fifth lens L5 are cemented to form a cemented lens. Alternatively, the imaging lens assembly may further include an optical filter L8 having an object side surface S15 and an image side surface S16. In the imaging lens assembly of the present embodiment, an aperture STO for limiting the light beam may also be provided to improve the image quality. Light from an object passes through the surfaces S1 to S16 sequentially and is finally imaged on an image plane S17.

Table 10 shows the surface type, the radius of curvature, the thickness, the material and the conic coefficient of each lens of the imaging lens assembly of embodiment 4, wherein the unit for the radius of curvature and the thickness is millimeter (mm). Table 11 shows higher-order coefficients of each aspheric mirror surface in embodiment 4. Table 12 shows the effective focal lengths f1 to f7 of the lenses, the total effective focal length f of the imaging lens assembly, the half of the diagonal length ImgH of the effective pixel area on the image plane S17, the half of the maximal field-of-view HFOV of the imaging lens assembly and the distance TTL from the object side surface S1 of the first lens L1 to the image plane S17 of the imaging lens assembly on the optical axis in embodiment 4. Here, the respective aspheric surface types may be defined by the formula (1) given in the above embodiment 1.

TABLE 10

| surface number | surface type | radius of curvature | thickness | index of refraction | dispersion coefficient | conic coefficient |
|---|---|---|---|---|---|---|
| OBJ | spherical | infinite | infinite | | | |
| S1 | spherical | 8.4266 | 0.7376 | 1.732 | 54.68 | |
| S2 | spherical | 2.2981 | 1.8945 | | | |
| S3 | aspheric | −9.3481 | 2.3881 | 1.645 | 23.53 | 15.3033 |
| S4 | aspheric | −6.6957 | −0.1000 | | | 2.3447 |
| STO | spherical | infinite | 0.4876 | | | |
| S5 | spherical | 15.7512 | 1.4086 | 1.807 | 56.57 | |
| S6 | spherical | −4.7947 | 0.0500 | | | |
| S7 | spherical | 6.4264 | 1.7215 | 1.591 | 64.14 | |
| S8 | spherical | −4.1083 | 0.3000 | 1.853 | 23.78 | |
| S9 | spherical | 5.2039 | 1.0448 | | | |
| S10 | aspheric | −25.1730 | 1.3091 | 1.546 | 56.11 | 0.0000 |
| S11 | aspheric | −18.9561 | 0.6257 | | | 0.0000 |
| S12 | aspheric | 3.1714 | 1.8871 | 1.546 | 56.11 | −7.1752 |
| S13 | aspheric | 8.4351 | 0.6408 | | | −2.3974 |
| S14 | spherical | infinite | 0.3000 | 1.517 | 64.17 | |
| S15 | spherical | infinite | 1.3047 | | | |
| S16 | spherical | infinite | | | | |

TABLE 11

| Surface number | A4 | A6 | A8 | A10 | A12 | A14 | A16 |
|---|---|---|---|---|---|---|---|
| S3 | −3.7359E−03 | 2.2151E−04 | −7.1690E−05 | 5.3657E−06 | −1.7279E−07 | 2.5998E−09 | −1.5041E−11 |
| S4 | 1.0883E−03 | −1.9210E−03 | 3.3736E−03 | −2.8032E−03 | 1.2696E−03 | −2.9341E−04 | 2.7126E−05 |
| S10 | −9.9658E−03 | −2.4312E−04 | 6.1825E−04 | −3.0871E−04 | 6.9944E−05 | −6.8443E−06 | 2.3970E−07 |
| S11 | −3.6737E−02 | 8.9341E−03 | −1.9358E−03 | 3.1641E−04 | −3.7066E−05 | 2.9148E−06 | −1.0500E−07 |
| S12 | −6.8837E−03 | 6.3204E−04 | −9.1429E−06 | −5.0866E−07 | 1.8551E−08 | −2.1768E−10 | 8.7413E−13 |
| S13 | −5.3574E−03 | −5.8906E−04 | 1.6337E−04 | −1.8267E−05 | 1.2421E−06 | −4.5893E−08 | 6.8089E−10 |

TABLE 12

| Parameter | f1(mm) | f2(mm) | f3(mm) | f4(mm) | f5(mm) | f6(mm) | f7(mm) |
|---|---|---|---|---|---|---|---|
| Numerical value | −4.55 | 27.06 | 4.70 | 4.52 | −2.65 | 130.86 | 8.26 |

| Parameter | f(mm) | ImgH(mm) | HFOV(°) | TTL(mm) |
|---|---|---|---|---|
| Numerical value | 3.51 | 3.93 | 61.67 | 16.00 |

Figure 8A:
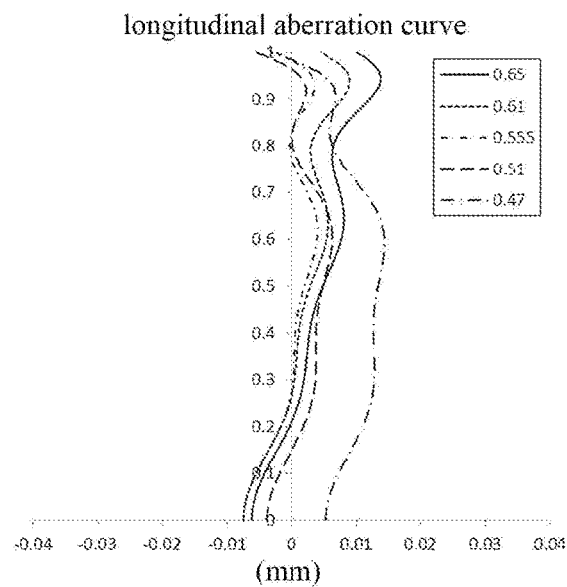
FIGS. 8A-8D respectively illustrate a longitudinal aberration curve, an astigmatic curve, a distortion curve and a lateral color curve of the imaging lens assembly according to embodiment 4.
Figure 8B:
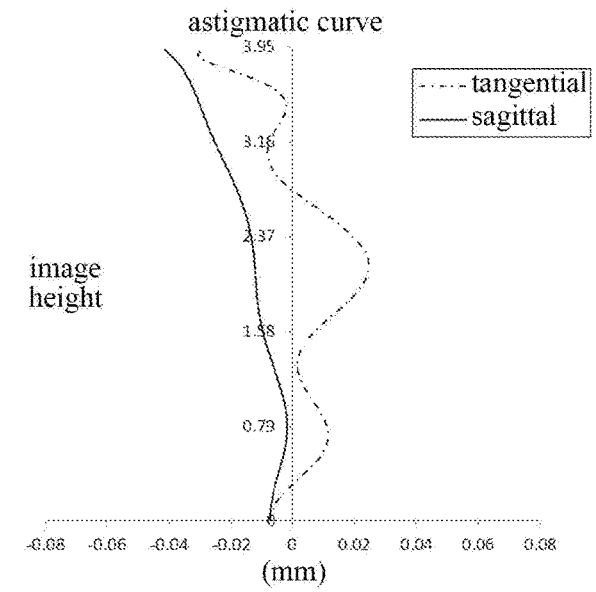
Figure 8C:
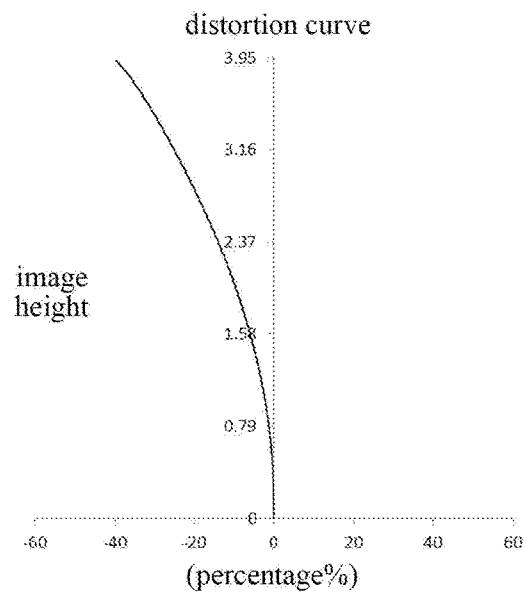
Figure 8D:
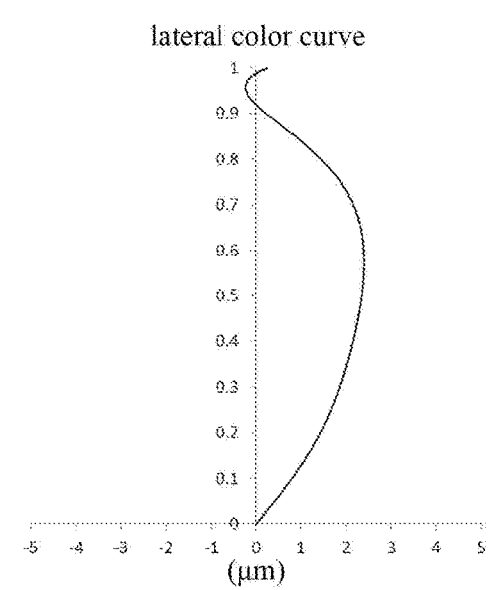

FIG. 8A shows a longitudinal aberration curve of the imaging lens assembly according to embodiment 4, representing deviations of focal points of light of different wavelengths converged after passing through the imaging lens assembly. FIG. 8B shows an astigmatic curve of the imaging lens assembly according to embodiment 4, representing a curvature of a tangential image plane and a curvature of a sagittal image plane. FIG. 8C shows a distortion curve of the imaging lens assembly according to embodiment 4, representing amounts of distortion at different viewing angles. FIG. 8D shows a lateral color curve of the imaging lens assembly according to embodiment 4, representing deviations of different image heights on an image plane after light passes through the imaging lens assembly. It can be seen from FIGS. 8A to 8D that the imaging lens assembly according to embodiment 4 can achieve a good image quality.

Embodiment 5

Figure 9:
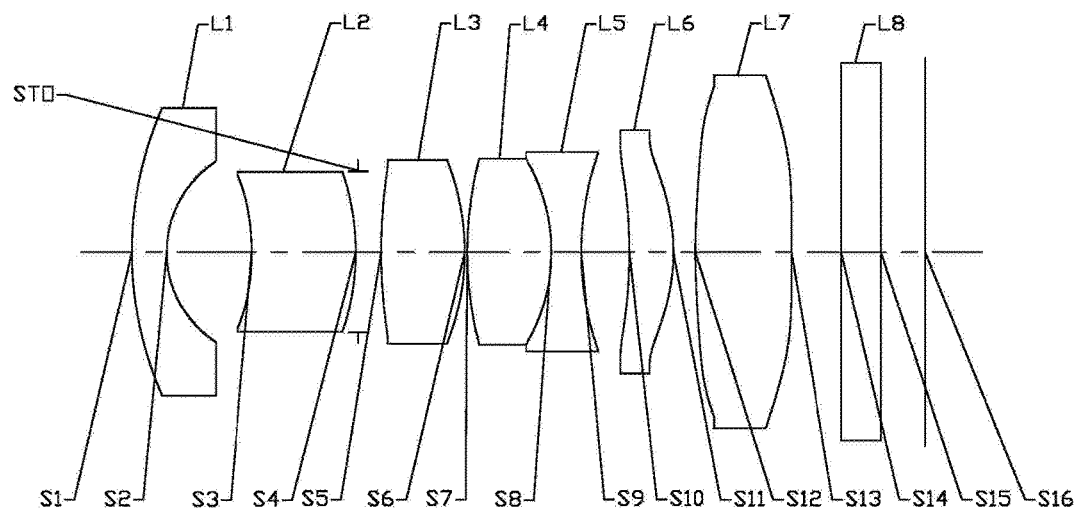
FIG. 9 is a schematic structural diagram of an imaging lens assembly according to embodiment 5 of the present disclosure.

An imaging lens assembly according to embodiment 5 of the present disclosure is described below with reference to FIGS. 9 to 10D. FIG. 9 is a schematic structural diagram of the imaging lens assembly according to embodiment 5 of the present disclosure.

As shown in FIG. 9, the imaging lens assembly includes, along an optical axis, seven lenses L1 to L7 arranged in sequence from an object side to an image side. The first lens L1 has an object side surface S1 and an image side surface S2; the second lens L2 has an object side surface S3 and an image side surface S4; the third lens L3 has an object side surface S5 and an image side surface S6; the fourth lens L4 has an object side surface S7 and an image side surface S8; the fifth lens L5 has an object side surface S9 and an image side surface S10; the sixth lens L6 has an object side surface S11 and an image side surface S12; and the seventh lens L7 has an object side surface S13 and an image side surface S14. The fourth lens L4 and the fifth lens L5 are cemented to form a cemented lens. Alternatively, the imaging lens assembly may further include an optical filter L8 having an object side surface S15 and an image side surface S16. In the imaging lens assembly of the present embodiment, an aperture STO for limiting the light beam may also be provided to improve the image quality. Light from an object passes through the surfaces S1 to S16 sequentially and is finally imaged on an image plane S17.

Table 13 shows the surface type, the radius of curvature, the thickness, the material and the conic coefficient of each lens of the imaging lens assembly of embodiment 5, wherein the unit for the radius of curvature and the thickness is millimeter (mm). Table 14 shows higher-order coefficients of each aspheric mirror surface in embodiment 5. Table 15 shows the effective focal lengths f1 to f7 of the lenses, the total effective focal length f of the imaging lens assembly, the half of the diagonal length ImgH of the effective pixel area on the image plane S17, the half of the maximal field-of-view HFOV of the imaging lens assembly and the distance TTL from the object side surface S1 of the first lens L1 to the image plane S17 of the imaging lens assembly on the optical axis in embodiment 5. Here, the respective aspheric surface types may be defined by the formula (1) given in the above embodiment 1.

TABLE 13

| surface number | surface type | radius of curvature | thickness | material index of refraction | material dispersion coefficient | conic coefficient |
|---|---|---|---|---|---|---|
| OBJ | spherical | infinite | infinite | | | |
| S1 | spherical | 7.3301 | 0.7000 | 1.732 | 54.68 | |
| S2 | spherical | 2.2000 | 1.7220 | | | |
| S3 | aspheric | −5.1829 | 2.0952 | 1.645 | 23.53 | 4.7612 |
| S4 | aspheric | −5.1020 | 0.0500 | | | −1.0810 |
| STO | spherical | infinite | 0.4614 | | | |
| S5 | spherical | 11.4212 | 1.6834 | 1.807 | 56.57 | |
| S6 | spherical | −5.0613 | 0.0500 | | | |
| S7 | spherical | 7.5904 | 1.7069 | 1.591 | 64.14 | |
| S8 | spherical | −3.7216 | 0.6000 | 1.853 | 23.78 | |
| S9 | spherical | 6.1133 | 0.9677 | | | |
| S10 | aspheric | −10.4315 | 0.8871 | 1.546 | 56.11 | 0.0000 |
| S11 | aspheric | −4.0042 | 0.4397 | | | 0.0000 |
| S12 | aspheric | 14.1299 | 1.9387 | 1.546 | 56.11 | 11.2434 |
| S13 | aspheric | −300.0000 | 1.0099 | | | −1.2218E+21 |
| S14 | spherical | infinite | 0.8000 | 1.517 | 64.17 | |
| S15 | spherical | infinite | 0.8879 | | | |
| S16 | spherical | infinite | | | | |

TABLE 14

| Surface number | A4 | A6 | A8 | A10 | A12 | A14 | A16 |
|---|---|---|---|---|---|---|---|
| S3 | −3.0960E−03 | 1.8958E−03 | −1.6403E−03 | 1.0851E−03 | −4.0119E−04 | 7.9637E−05 | −6.1652E−06 |
| S4 | −1.9771E−03 | 1.0269E−03 | −1.3872E−03 | 1.1594E−03 | −5.1085E−04 | 1.1581E−04 | −1.0555E−05 |
| S10 | 2.0815E−03 | −2.6591E−03 | 1.0404E−03 | −2.0553E−04 | 4.7838E−05 | −7.5736E−06 | 4.5484E−07 |
| S11 | 8.6649E−03 | −4.1431E−03 | 1.6113E−03 | −3.6693E−04 | 7.8719E−05 | −9.8659E−06 | 4.7143E−07 |
| S12 | −4.3528E−04 | −2.3819E−03 | 6.8822E−04 | −8.5068E−05 | 5.5918E−06 | −1.9353E−07 | 2.7200E−09 |
| S13 | −5.1084E−03 | −3.5934E−04 | 8.9933E−05 | −6.2023E−06 | 3.4673E−07 | −1.8007E−08 | 3.7866E−10 |

TABLE 15

| Parameter | f1(mm) | f2(mm) | f3(mm) | f4(mm) | f5(mm) | f6(mm) | f7(mm) |
|---|---|---|---|---|---|---|---|
| Numerical value | −4.56 | 45.48 | 4.55 | 4.48 | −2.64 | 11.35 | 24.77 |

| Parameter | f(mm) | ImgH(mm) | HFOV(°) | TTL(mm) |
|---|---|---|---|---|
| Numerical value | 3.54 | 3.93 | 62.14 | 16.00 |

Figures 10A, 10B:
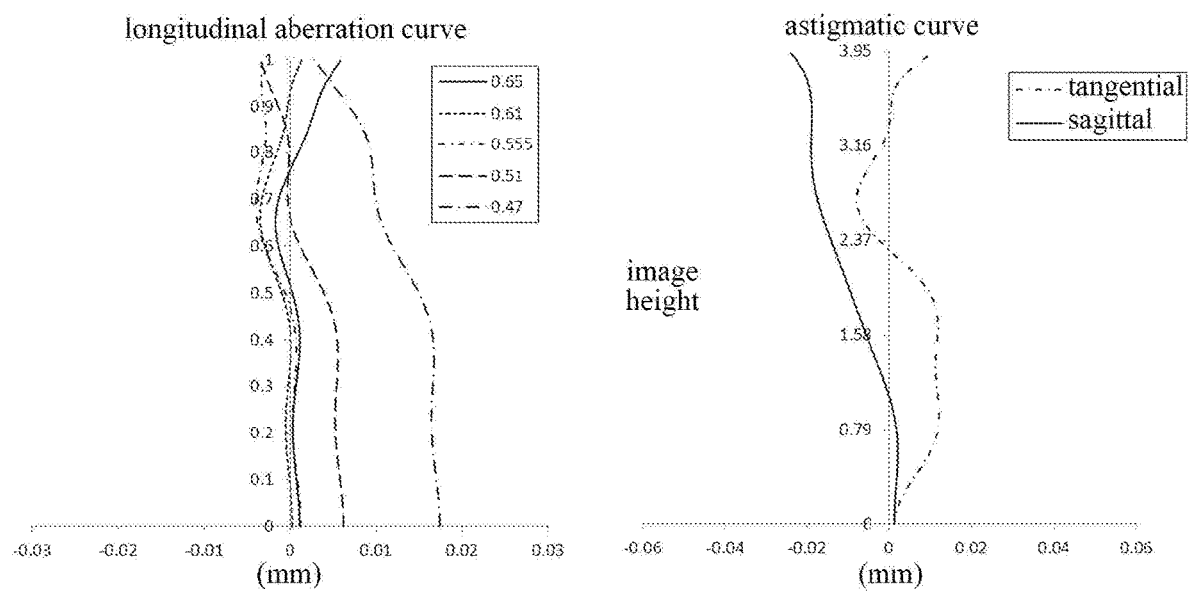
FIGS. 10A-10D respectively illustrate a longitudinal aberration curve, an astigmatic curve, a distortion curve and a lateral color curve of the imaging lens assembly according to embodiment 5.
Figure 10C:
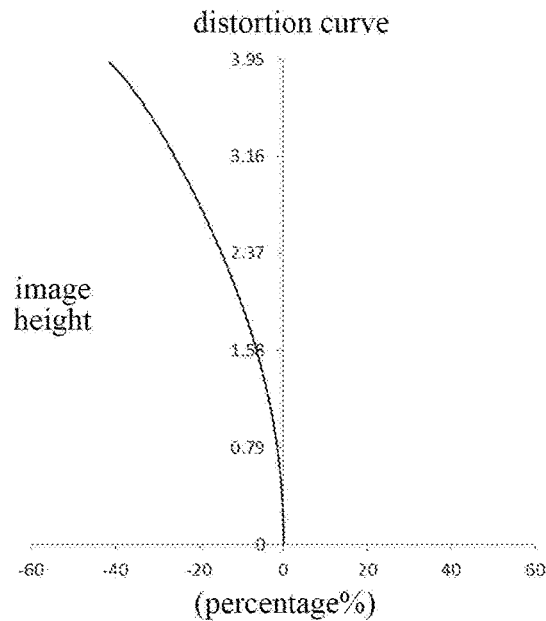
Figure 10D:
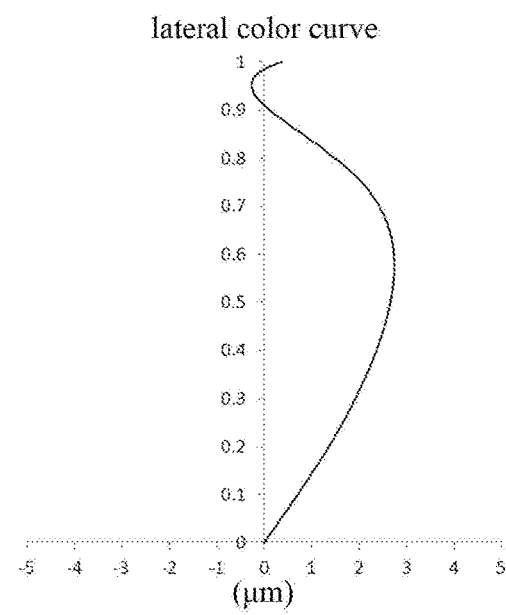

FIG. 10A shows a longitudinal aberration curve of the imaging lens assembly according to embodiment 5, representing deviations of focal points of light of different wavelengths converged after passing through the imaging lens assembly. FIG. 10B shows an astigmatic curve of the imaging lens assembly according to embodiment 5, representing a curvature of a tangential image plane and a curvature of a sagittal image plane. FIG. 10C shows a distortion curve of the imaging lens assembly according to embodiment 5, representing amounts of distortion at different viewing angles. FIG. 10D shows a lateral color curve of the imaging lens assembly according to embodiment 5, representing deviations of different image heights on an image plane after light passes through the imaging lens assembly. It can be seen from FIGS. 10A to 10D that the imaging lens assembly according to embodiment 5 can achieve a good image quality.

Embodiment 6

Figure 11:
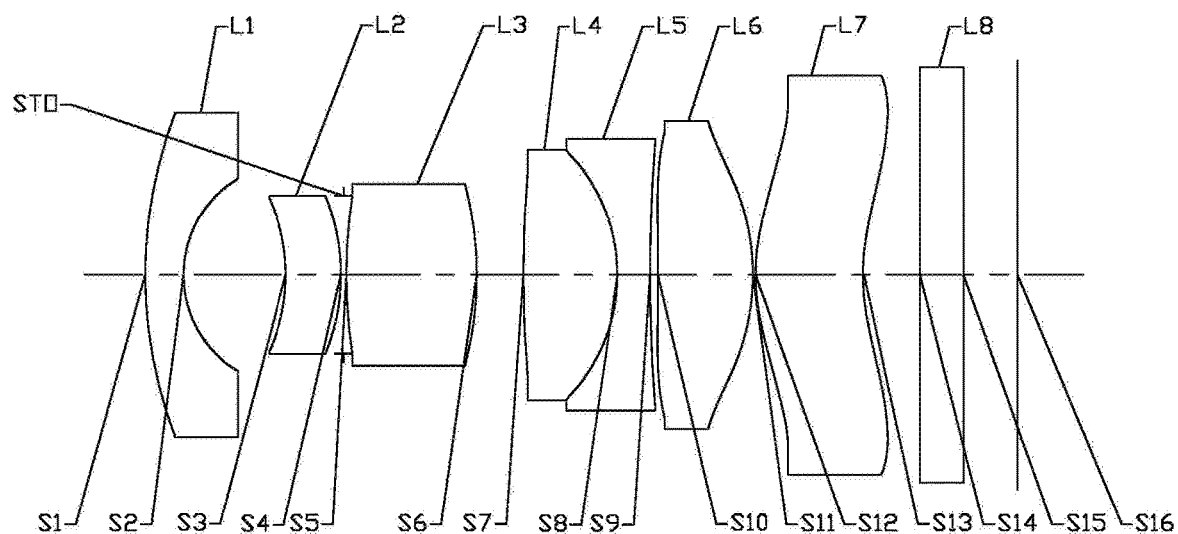
FIG. 11 is a schematic structural diagram of an imaging lens assembly according to embodiment 6 of the present disclosure.

An imaging lens assembly according to embodiment 6 of the present disclosure is described below with reference to FIGS. 11 to 12D. FIG. 11 is a schematic structural diagram of the imaging lens assembly according to embodiment 6 of the present disclosure.

As shown in FIG. 11, the imaging lens assembly includes, along an optical axis, seven lenses L1 to L7 arranged in sequence from an object side to an image side. The first lens L1 has an object side surface S1 and an image side surface S2; the second lens L2 has an object side surface S3 and an image side surface S4; the third lens L3 has an object side surface S5 and an image side surface S6; the fourth lens L4 has an object side surface S7 and an image side surface S8; the fifth lens L5 has an object side surface S9 and an image side surface S10; the sixth lens L6 has an object side surface S11 and an image side surface S12; and the seventh lens L7 has an object side surface S13 and an image side surface S14. The fourth lens L4 and the fifth lens L5 are cemented to form a cemented lens. Alternatively, the imaging lens assembly may further include an optical filter L8 having an object side surface S15 and an image side surface S16. In the imaging lens assembly of the present embodiment, an aperture STO for limiting the light beam may also be provided to improve the image quality. Light from an object passes through the surfaces S1 to S16 sequentially and is finally imaged on an image plane S17.

Table 16 shows the surface type, the radius of curvature, the thickness, the material and the conic coefficient of each lens of the imaging lens assembly of embodiment 6, wherein the unit for the radius of curvature and the thickness is millimeter (mm). Table 17 shows higher-order coefficients of each aspheric mirror surface in embodiment 6. Table 18 shows the effective focal lengths f1 to f7 of the lenses, the total effective focal length f of the imaging lens assembly, the half of the diagonal length ImgH of the effective pixel area on the image plane S17, the half of the maximal field-of-view HFOV of the imaging lens assembly and the distance TTL from the object side surface S1 of the first lens L1 to the image plane S17 of the imaging lens assembly on the optical axis in embodiment 6. Here, the respective aspheric surface types may be defined by the formula (1) given in the above embodiment 1.

TABLE 16

| surface number | surface type | radius of curvature | thickness | index of refraction | dispersion coefficient | conic coefficient |
|---|---|---|---|---|---|---|
| OBJ | spherical | infinite | infinite | | | |
| S1 | spherical | 8.3266 | 0.7000 | 1.546 | 56.11 | |
| S2 | spherical | 2.0758 | 1.8788 | | | |
| S3 | aspheric | −3.5060 | 1.0134 | 1.645 | 23.53 | 1.6737 |
| S4 | aspheric | −3.9391 | 0.0500 | | | −0.1677 |
| STO | spherical | infinite | 0.0500 | | | |
| S5 | spherical | 9.4945 | 2.3870 | 1.807 | 56.57 | |
| S6 | spherical | −6.6890 | 0.8526 | | | |
| S7 | spherical | 22.5256 | 1.7345 | 1.591 | 64.14 | |
| S8 | spherical | −3.2636 | 0.6000 | 1.853 | 23.78 | |
| S9 | spherical | 33.2668 | 0.1387 | | | |
| S10 | aspheric | −36.3604 | 1.7408 | 1.546 | 56.11 | 0.0000 |
| S11 | aspheric | −4.3233 | 0.0500 | | | 0.0000 |
| S12 | aspheric | 3.7887 | 1.9780 | 1.546 | 56.11 | 0.0000 |
| S13 | aspheric | 4.2481 | 1.0386 | | | 0.0000 |
| S14 | spherical | infinite | 0.8000 | 1.517 | 64.17 | |
| S15 | spherical | infinite | 0.9876 | | | |
| S16 | spherical | infinite | | | | |

TABLE 17

| Surface number | A4 | A6 | A8 | A10 | A12 | A14 | A16 |
|---|---|---|---|---|---|---|---|
| S3 | 3.0495E−03 | 2.6078E−04 | 4.6653E−04 | −3.5445E−04 | 2.0235E−04 | −6.4637E−05 | 8.9457E−06 |
| S4 | −6.5201E−04 | −3.2508E−03 | 4.9834E−03 | −4.3441E−03 | 2.0560E−03 | −5.0503E−04 | 5.0359E−05 |
| S10 | 9.2204E−03 | −2.5050E−03 | 5.6156E−04 | −6.9412E−05 | 4.8289E−06 | −1.4415E−07 | 7.8836E−10 |
| S11 | −2.7043E−03 | 1.1147E−03 | −1.0369E−04 | 3.3831E−06 | 2.5011E−06 | −3.8923E−07 | 1.8548E−08 |
| S12 | −1.5367E−02 | 1.7325E−03 | −4.3983E−04 | 8.3974E−05 | −9.6587E−06 | 5.8582E−07 | −1.5030E−08 |
| S13 | −9.8408E−03 | −5.9885E−04 | 1.6100E−04 | −1.5981E−05 | 8.1788E−07 | −2.3542E−08 | 2.4306E−10 |

TABLE 18

| Parameter | f1(mm) | f2(mm) | f3(mm) | f4(mm) | f5(mm) | f6(mm) | f7(mm) |
|---|---|---|---|---|---|---|---|
| Numerical value | −5.27 | −595.82 | 5.20 | 4.95 | −3.46 | 8.82 | 25.46 |

| Parameter | f(mm) | ImgH(mm) | HFOV(°) | TTL(mm) |
|---|---|---|---|---|
| Numerical value | 3.57 | 3.93 | 62.32 | 16.00 |

Figure 12A:
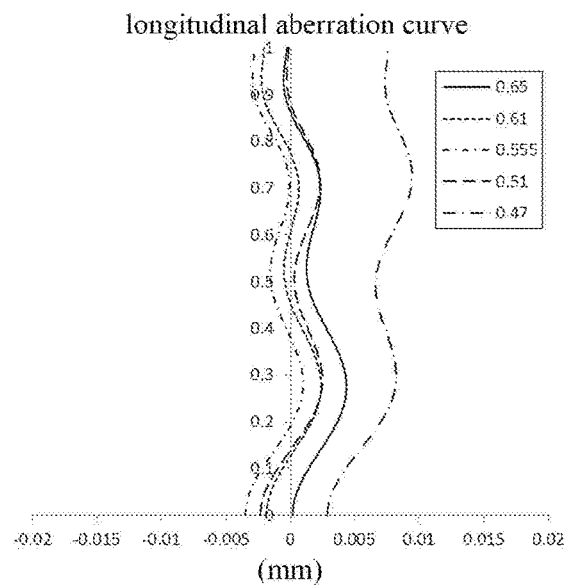
FIGS. 12A-12D respectively illustrate a longitudinal aberration curve, an astigmatic curve, a distortion curve and a lateral color curve of the imaging lens assembly according to embodiment 6.
Figure 12B:
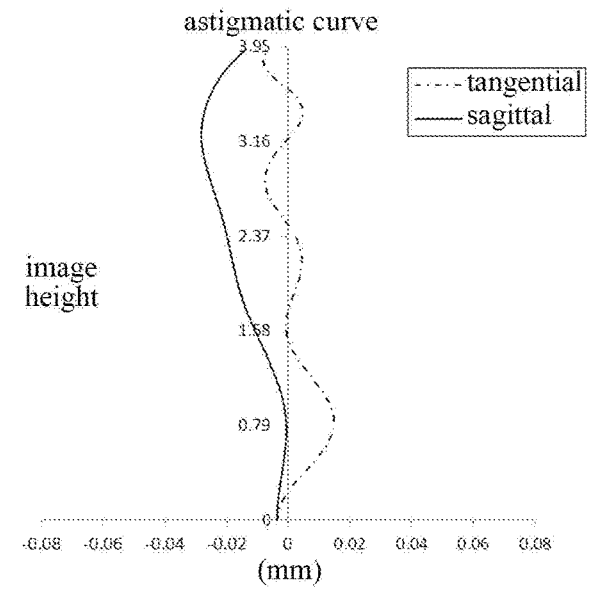
Figure 12C:
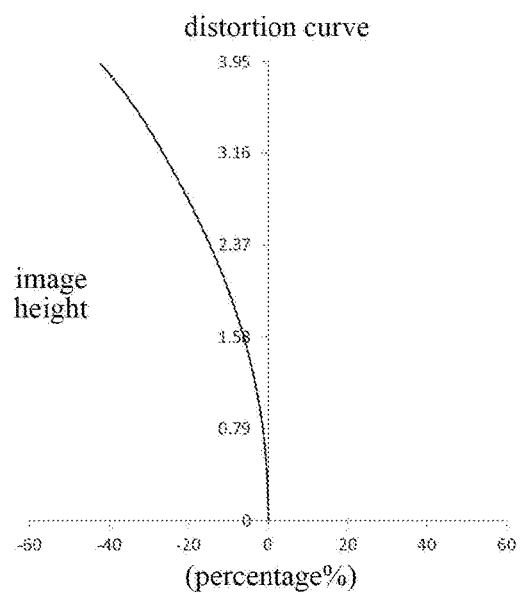
Figure 12D:
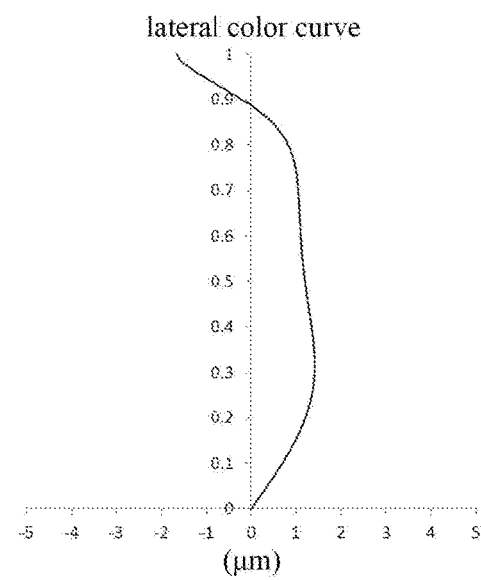

FIG. 12A shows a longitudinal aberration curve of the imaging lens assembly according to embodiment 6, representing deviations of focal points of light of different wavelengths converged after passing through the imaging lens assembly. FIG. 12B shows an astigmatic curve of the imaging lens assembly according to embodiment 6, representing a curvature of a tangential image plane and a curvature of a sagittal image plane. FIG. 12C shows a distortion curve of the imaging lens assembly according to embodiment 6, representing amounts of distortion at different viewing angles. FIG. 12D shows a lateral color curve of the imaging lens assembly according to embodiment 6, representing deviations of different image heights on an image plane after light passes through the imaging lens assembly. It can be seen from FIGS. 12A to 12D that the imaging lens assembly according to embodiment 6 can achieve a good image quality.

Embodiment 7

Figure 13:
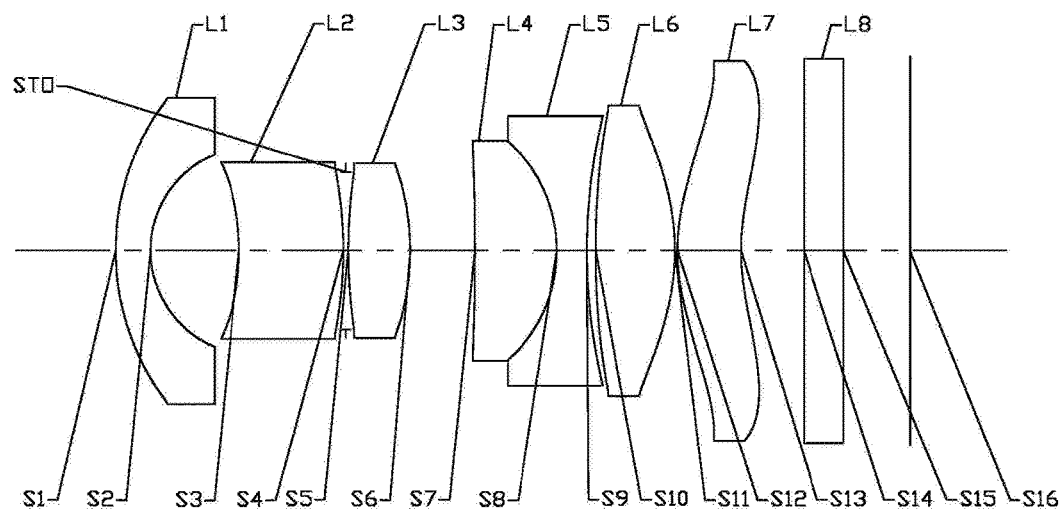
FIG. 13 is a schematic structural diagram of an imaging lens assembly according to embodiment 7 of the present disclosure.

An imaging lens assembly according to embodiment 7 of the present disclosure is described below with reference to FIGS. 13 to 14D. FIG. 13 is a schematic structural diagram of the imaging lens assembly according to embodiment 7 of the present disclosure.

As shown in FIG. 13, the imaging lens assembly includes, along an optical axis, seven lenses L1 to L7 arranged in sequence from an object side to an image side. The first lens L1 has an object side surface S1 and an image side surface S2; the second lens L2 has an object side surface S3 and an image side surface S4; the third lens L3 has an object side surface S5 and an image side surface S6; the fourth lens L4 has an object side surface S7 and an image side surface S8; the fifth lens L5 has an object side surface S9 and an image side surface S10; the sixth lens L6 has an object side surface S11 and an image side surface S12; and the seventh lens L7 has an object side surface S13 and an image side surface S14. The fourth lens L4 and the fifth lens L5 are cemented to form a cemented lens. Alternatively, the imaging lens assembly may further include an optical filter L8 having an object side surface S15 and an image side surface S16. In the imaging lens assembly of the present embodiment, an aperture STO for limiting the light beam may also be provided to improve the image quality. Light from an object passes through the surfaces S1 to S16 sequentially and is finally imaged on an image plane S17.

Table 19 shows the surface type, the radius of curvature, the thickness, the material and the conic coefficient of each lens of the imaging lens assembly of embodiment 7, wherein the unit for the radius of curvature and the thickness is millimeter (mm). Table 20 shows higher-order coefficients of each aspheric mirror surface in embodiment 7. Table 21 shows the effective focal lengths f1 to f7 of the lenses, the total effective focal length f of the imaging lens assembly, the half of the diagonal length ImgH of the effective pixel area on the image plane S17, the half of the maximal field-of-view HFOV of the imaging lens assembly and the distance TTL from the object side surface S1 of the first lens L1 to the image plane S17 of the imaging lens assembly on the optical axis in embodiment 7. Here, the respective aspheric surface types may be defined by the formula (1) given in the above embodiment 1.

TABLE 19

| surface number | surface type | radius of curvature | thickness | index of refraction | dispersion coefficient | conic coefficient |
|---|---|---|---|---|---|---|
| OBJ | spherical | infinite | infinite | | | |
| S1 | spherical | 5.1238 | 0.7000 | 1.732 | 54.68 | |
| S2 | spherical | 2.1242 | 1.7838 | | | |

TABLE 19-continued

| surface number | surface type | radius of curvature | thickness | material index of refraction | dispersion coefficient | conic coefficient |
|---|---|---|---|---|---|---|
| S3 | aspheric | −5.2278 | 2.1014 | 1.645 | 23.53 | 3.7233 |
| S4 | aspheric | −8.4611 | 0.0500 | | | −4.4272 |
| STO | spherical | infinite | 0.0500 | | | |
| S5 | spherical | 11.4207 | 1.2465 | 1.807 | 56.57 | |
| S6 | spherical | −5.1980 | 1.2980 | | | |
| S7 | spherical | −57.0466 | 1.6563 | 1.546 | 56.11 | |
| S8 | spherical | −3.0000 | 0.6000 | 1.645 | 23.53 | |
| S9 | spherical | 11.7189 | 0.1828 | | | |
| S10 | aspheric | 25.7496 | 1.5897 | 1.546 | 56.11 | 0.0000 |
| S11 | aspheric | −4.8224 | 0.0500 | | | 0.0000 |
| S12 | aspheric | 4.0602 | 1.2784 | 1.546 | 56.11 | 0.0000 |
| S13 | aspheric | 4.5933 | 1.2664 | | | 0.0000 |
| S14 | spherical | infinite | 0.8000 | 1.517 | 64.17 | |
| S15 | spherical | infinite | 1.3467 | | | |
| S16 | spherical | infinite | | | | |

TABLE 20

| Surface number | A4 | A6 | A8 | A10 | A12 | A14 | A16 |
|---|---|---|---|---|---|---|---|
| S3 | −1.4633E−03 | 3.6635E−03 | −4.8602E−03 | 3.6316E−03 | −1.4806E−03 | 3.1021E−04 | −2.6059E−05 |
| S4 | −1.7348E−04 | −1.8831E−03 | 3.3958E−03 | −3.0964E−03 | 1.5379E−03 | −3.8979E−04 | 3.9399E−05 |
| S10 | 6.0460E−03 | −1.7363E−03 | 4.3265E−04 | −9.1468E−05 | 1.1913E−05 | −7.9849E−07 | 2.1898E−08 |
| S11 | 3.2575E−03 | −3.6518E−04 | 2.8585E−04 | −7.7251E−05 | 9.5967E−06 | −5.5950E−07 | 1.3569E−08 |
| S12 | −1.1480E−02 | 5.1254E−04 | 6.6478E−05 | −2.5333E−05 | 2.8635E−06 | −1.4633E−07 | 2.7260E−09 |
| S13 | −1.3595E−02 | 6.0390E−04 | 5.7792E−05 | −1.8978E−05 | 1.8753E−06 | −8.6990E−08 | 1.5361E−09 |

TABLE 21

| Parameter | f1(mm) | f2(mm) | f3(mm) | f4(mm) | f5(mm) | f6(mm) | f7(mm) |
|---|---|---|---|---|---|---|---|
| Numerical value | −5.50 | −28.48 | 4.58 | 5.74 | −3.65 | 7.58 | 34.70 |

| Parameter | f(mm) | ImgH(mm) | HFOV(°) | TTL(mm) |
|---|---|---|---|---|
| Numerical value | 3.60 | 3.93 | 63.91 | 16.00 |

Figure 14A:
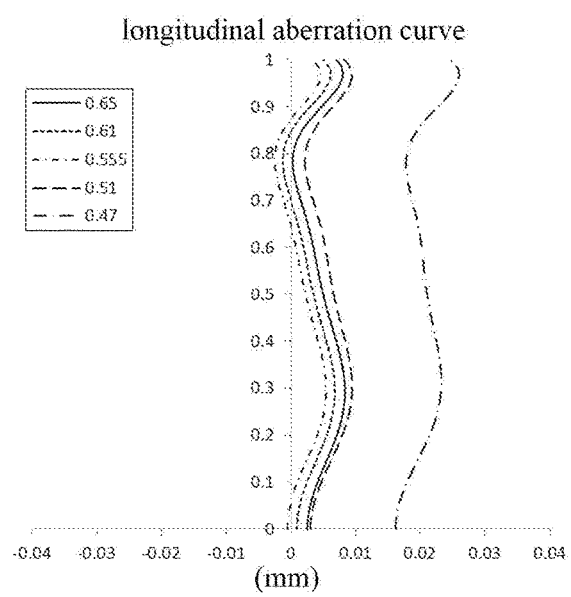
FIGS. 14A-14D respectively illustrate a longitudinal aberration curve, an astigmatic curve, a distortion curve and a lateral color curve of the imaging lens assembly according to embodiment 7.
Figure 14B:
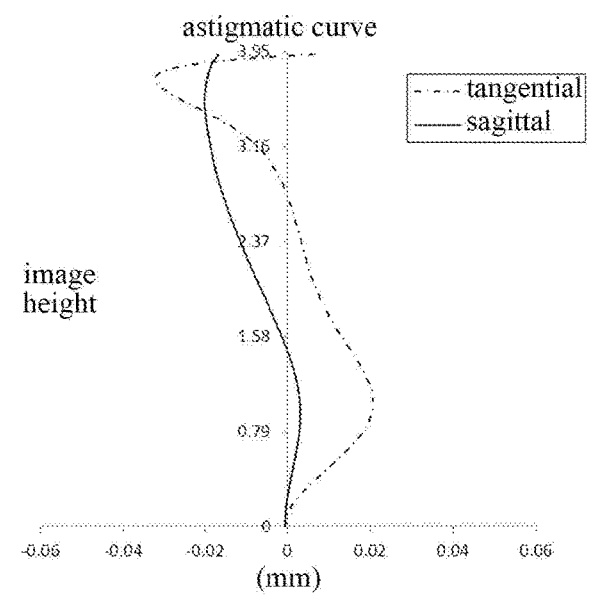
Figure 14C:
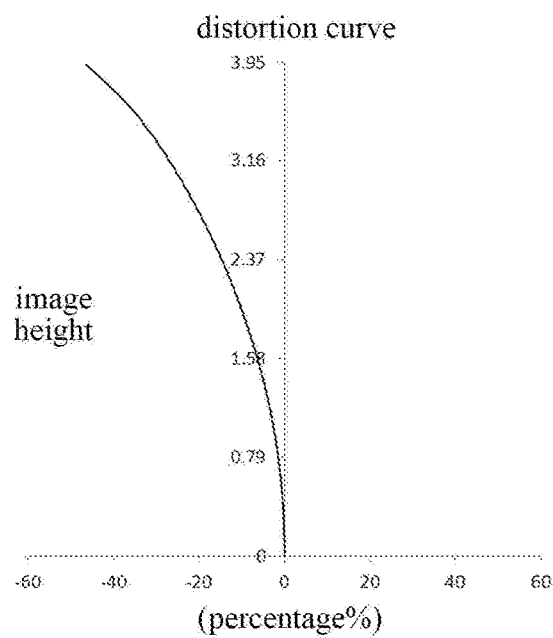
Figure 14D:
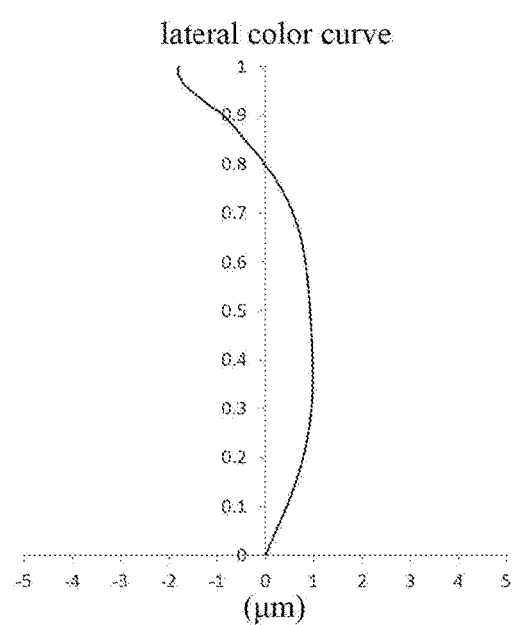

FIG. 14A shows a longitudinal aberration curve of the imaging lens assembly according to embodiment 7, representing deviations of focal points of light of different wavelengths converged after passing through the imaging lens assembly. FIG. 14B shows an astigmatic curve of the imaging lens assembly according to embodiment 7, representing a curvature of a tangential image plane and a curvature of a sagittal image plane. FIG. 14C shows a distortion curve of the imaging lens assembly according to embodiment 7, representing amounts of distortion at different viewing angles. FIG. 14D shows a lateral color curve of the imaging lens assembly according to embodiment 7, representing deviations of different image heights on an image plane after light passes through the imaging lens assembly. It can be seen from FIGS. 14A to 14D that the imaging lens assembly according to embodiment 7 can achieve a good image quality.

In summary, embodiment 1 to embodiment 7 respectively satisfy the relationships shown in Table 22 below.

TABLE 22

| conditional formula | embodiment | | | | | | |
|---|---|---|---|---|---|---|---|
| | 1 | 2 | 3 | 4 | 5 | 6 | 7 |
| f5/f | −0.77 | −1.07 | −0.92 | −0.76 | −0.75 | −0.97 | −1.01 |
| f3/f | 1.37 | 1.49 | 1.30 | 1.34 | 1.29 | 1.46 | 1.27 |
| TTL/f | 4.57 | 4.53 | 4.47 | 4.56 | 4.53 | 4.48 | 4.45 |
| tan(HFOV) | 2.12 | 1.89 | 2.00 | 1.85 | 1.89 | 1.91 | 2.04 |
| R3/R4 | 1.14 | 0.75 | 1.04 | 1.40 | 1.02 | 0.89 | 0.62 |
| f4/f | 1.40 | 1.17 | 1.54 | 1.29 | 1.27 | 1.38 | 1.60 |
| R2/f1 | −0.52 | −0.46 | −0.48 | −0.51 | −0.48 | −0.39 | −0.39 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An imaging lens assembly, having half of a maximal field-of-view HFOV, the imaging lens assembly comprising sequentially, along an optical axis from an object side to an image side, a first lens, a second lens, a third lens, a fourth lens, a fifth lens, a sixth lens and a seventh lens,
wherein each of the first lens and the fifth lens has a negative focal power;
each of the second lens, the fourth lens, the sixth lens and the seventh lens has a positive focal power or a negative focal power; and
the third lens has a positive focal power,
wherein the half of the maximal field-of-view HFOV satisfies: $1.7<\tan(HFOV)<2.5$, and
wherein the fourth lens and the fifth lens are cemented to form a cemented lens.

2. The imaging lens assembly according to claim 1, wherein an image side surface of the second lens is a convex surface, and an object side surface of the seventh lens is a convex surface.

3. The imaging lens assembly according to claim 2, wherein the third lens is a glass lens.

4. The imaging lens assembly according to claim 1, having a total effective focal length f, wherein the third lens has a positive focal power, and an effective focal length f3 of the third lens and the total effective focal length f satisfy: $1<f3/f<1.5$.

5. The imaging lens assembly according to claim 4, wherein the fourth lens has a positive focal power, and an effective focal length f4 of the fourth lens and the total effective focal length f satisfy: $1<f4/f<1.7$.

6. The imaging lens assembly according to claim 5, wherein an effective focal length f5 of the fifth lens and the total effective focal length f satisfy: $-1.15<f5/f<0$.

7. The imaging lens assembly according to claim 6, wherein a distance TTL from an object side surface of the first lens to an image plane of the imaging lens assembly on the optical axis and the total effective focal length f satisfy: $4.2<TTL/f<5.5$.

8. The imaging lens assembly according to claim 1, wherein a radius of curvature R3 of an object side surface of the second lens and a radius of curvature R4 of an image side surface of the second lens satisfy: $0.6<R3/R4\leq1.4$.

9. The imaging lens assembly according to claim 1, wherein a radius of curvature R2 of an image side surface of the first lens and an effective focal length f1 of the first lens satisfy: $-0.6<R2/f1<-0.2$.

* * * * *